United States Patent [19]
Kihara et al.

[11] Patent Number: 5,577,382
[45] Date of Patent: Nov. 26, 1996

[54] EXHAUST PURIFICATION DEVICE OF INTERNAL COMBUSTION ENGINE

[75] Inventors: Tetsuro Kihara, Susono; Kenji Katoh, Sunto-gun; Takamitsu Asanuma, Susono; Satoshi Iguchi, Mishima, all of Japan

[73] Assignee: Toyota Jidosha Kabushiki Kaisha, Aichi, Japan

[21] Appl. No.: 493,657

[22] Filed: Jun. 22, 1995

[30] Foreign Application Priority Data

Jun. 30, 1994 [JP] Japan ................ 6-149446

[51] Int. Cl.$^6$ ................................. F01N 3/28
[52] U.S. Cl. ........................... 60/276; 60/277
[58] Field of Search ...................... 60/276, 277

[56] References Cited

U.S. PATENT DOCUMENTS 4,622,809  11/1986  Abthoff et al. .

FOREIGN PATENT DOCUMENTS

| | | |
|---|---|---|
| 444783 | 9/1991 | European Pat. Off. . |
| 580389 | 1/1994 | European Pat. Off. . |
| 2-130245 | 5/1990 | Japan . |
| 4-17141 | 2/1992 | Japan . |
| 5-106494 | 4/1993 | Japan . |
| 5-312025 | 11/1993 | Japan . |
| 6-88518 | 3/1994 | Japan . |
| 2251079 | 11/1986 | United Kingdom . |
| WO93/07363 | 4/1993 | WIPO . |

Primary Examiner—Douglas Hart
Attorney, Agent, or Firm—Kenyon & Kenyon

[57] ABSTRACT

An exhaust purification device which is capable of detecting the degree of deterioration of the NOx absorbent or the three-way catalyst arranged in the exhaust passage of an engine. An $O_2$ sensor whose output current or output voltage is proportional to the air-fuel ratio is arranged inside the exhaust passage downstream of the NOx absorbent or three-way catalyst. The air-fuel ratio of the air-fuel mixture is temporarily changed from lean to rich or from rich to lean to enable the degree of deterioration of the NOx absorbent or three-way catalyst to be detected from the peak value of the output current or voltage of the $O_2$ sensor during the time when the air-fuel ratio is changed.

16 Claims, 19 Drawing Sheets

RICH ← STOICHIOMETRIC AIR-FUEL RATIO → LEAN

EXHAUST PURIFICATION DEVICE OF INTERNAL COMBUSTION ENGINE

BACKGROUND OF THE INVENTION

1. Field of the Invention

The present invention relates to an exhaust purification device of an internal combustion engine.

2. Description of the Related Art

A three-way catalyst has long been used for removing the harmful components from exhaust gas. Such a three-way catalyst has a so-called $O_2$ storage function whereby it takes in and stores the oxygen in the exhaust gas when the air-fuel ratio becomes lean. It uses this $O_2$ storage function to efficiently remove the three harmful components in exhaust gas, that is, HC, CO, and NOx. Accordingly, when this storage function weakens, the purification ability becomes lower, that is, the three-way catalyst deteriorates.

If the ratio between the total amount of air and the total amount of fuel fed to the exhaust passage upstream of a certain point in the exhaust passage or in the intake passage is defined as the air-fuel ratio of the exhaust gas at that certain point, when the air-fuel ratio of the exhaust gas flowing into the three-way catalyst changes from lean to rich, the unburnt HC and the CO in the exhaust gas seize the oxygen stored in the three-way catalyst. The unburnt HC and the CO can be oxidized by the seized oxygen. During the period when the unburnt HC and the CO are oxidized by the oxygen stored in the three-way catalyst in this way, the air-fuel ratio of the exhaust gas flowing out from the three-way catalyst becomes substantially the stoichiometric air-fuel ratio. When the oxygen stored in the three-way catalyst runs out, the air-fuel ratio of the exhaust gas flowing out from the three-way catalyst becomes rich. In this case, the stronger the $O_2$ storage function, the longer the time when the air-fuel ratio of the exhaust gas flowing out from the three-way catalyst is maintained at substantially the stoichiometric air-fuel ratio. When the $O_2$ storage function weakens, the time during which the air-fuel ratio of the exhaust gas flowing out from the three-way catalyst is maintained at substantially the stoichiometric air-fuel ratio becomes shorter.

There is known an internal combustion engine which is designed so that after the exhaust gas flowing into the three-way catalyst changes from lean to rich, the time during which the air-fuel ratio of the exhaust gas flowing out from the three-way catalyst is maintained at substantially the stoichiometric air-fuel ratio is detected and it is judged that the degree of deterioration of the three-way catalyst is advancing along with the shortening of that time (see Japanese Unexamined Patent Publication (Kokai) No. 2-130245).

The time during which the air-fuel ratio of the exhaust gas flowing out from the three-way catalyst is maintained at substantially the stoichiometric air-fuel ratio is, however, extremely short. It is difficult to accurately detect such a short time without error and to accurately judge the degree of deterioration from the results of that detection. Further, sometimes the air-fuel ratio of the exhaust gas flowing out from the three-way catalyst becomes rich in a spike-like fashion due to some reason or another when maintained at the stoichiometric air-fuel ratio. If such a "rich spike" occurs, there is the problem that the degree of deterioration of the three-way catalyst ends up being completely erroneously judged.

SUMMARY OF THE INVENTION

An object of the invention is to provide an exhaust purification device capable of accurately detecting the degree of deterioration of an exhaust gas purification element.

According to the present invention, there is provided an exhaust purification device of an engine having an exhaust passage, including an exhaust purification element arranged in the exhaust passage to remove harmful components contained in an exhaust gas, the exhaust purification element having the property that, when an air-fuel ratio of the exhaust gas flowing into the exhaust purification element is changed from lean to rich, an air-fuel ratio of the exhaust gas flowing out from the exhaust purification element is temporarily maintained substantially at the stoichiometric air-fuel ratio and then changed to rich and, at this time, the time during which the air-fuel ratio of the exhaust gas flowing out from the exhaust purification element is maintained substantially at the stoichiometric air-fuel ratio becoming shorter as the exhaust purification element deteriorates; an oxygen concentration sensor arranged in the exhaust passage downstream of the exhaust purification element and producing an output having a level which is proportional to the oxygen concentration in the exhaust gas; air-fuel ratio change-over means for temporarily changing the air-fuel ratio of the exhaust gas, which flows into the exhaust purification element, from lean to rich for a predetermined fixed time; peak value detecting means for finding a peak value of the level of the output of the oxygen concentration sensor within the predetermined fixed time during which the air-fuel ratio of the exhaust gas flowing into the exhaust purification element is temporarily maintained at a rich air-fuel ratio by the air-fuel ratio change-over means; and judgement means for judging a degree of deterioration of the exhaust purification element on the basis of the peak value of the level of the output.

In addition, according to the present invention, there is provided an exhaust purification device of an engine having an exhaust passage, including an exhaust purification element arranged in the exhaust passage to remove harmful components contained in an exhaust gas, the exhaust purification element having the property that, when an air-fuel ratio of the exhaust gas flowing into the exhaust purification element is changed from rich to lean, an air-fuel ratio of the exhaust gas flowing out from the exhaust purification element is temporarily maintained substantially at the stoichiometric air-fuel ratio and then changed to rich and, at this time, the time during which the air-fuel ratio of the exhaust gas flowing out from the exhaust purification element is maintained substantially at the stoichiometric air-fuel ratio becoming shorter as the exhaust purification element deteriorates; an oxygen concentration sensor arranged in the exhaust passage downstream of the exhaust purification element and producing an output having a level which is proportional to the oxygen concentration in the exhaust gas; air-fuel ratio change-over means for temporarily changing the air-fuel ratio of the exhaust gas, which flows into the exhaust purification element, from rich to lean for a predetermined fixed time; peak value detecting means for finding a peak value of the level of the output of the oxygen concentration sensor within the predetermined fixed time during which the air-fuel ratio of the exhaust gas flowing into the exhaust purification element is temporarily maintained at a lean air-fuel ratio by the air-fuel ratio change-over means; and judgement means for judging a degree of deterioration of the exhaust purification element on the basis of the peak value of the level of the output.

BRIEF DESCRIPTION OF THE DRAWINGS

These and other objects and features of the present invention will be more fully understood from the description of the preferred embodiments of the invention set forth below together with the accompanying drawings, in which.

DESCRIPTION OF THE PREFERRED EMBODIMENTS

Figure 1:
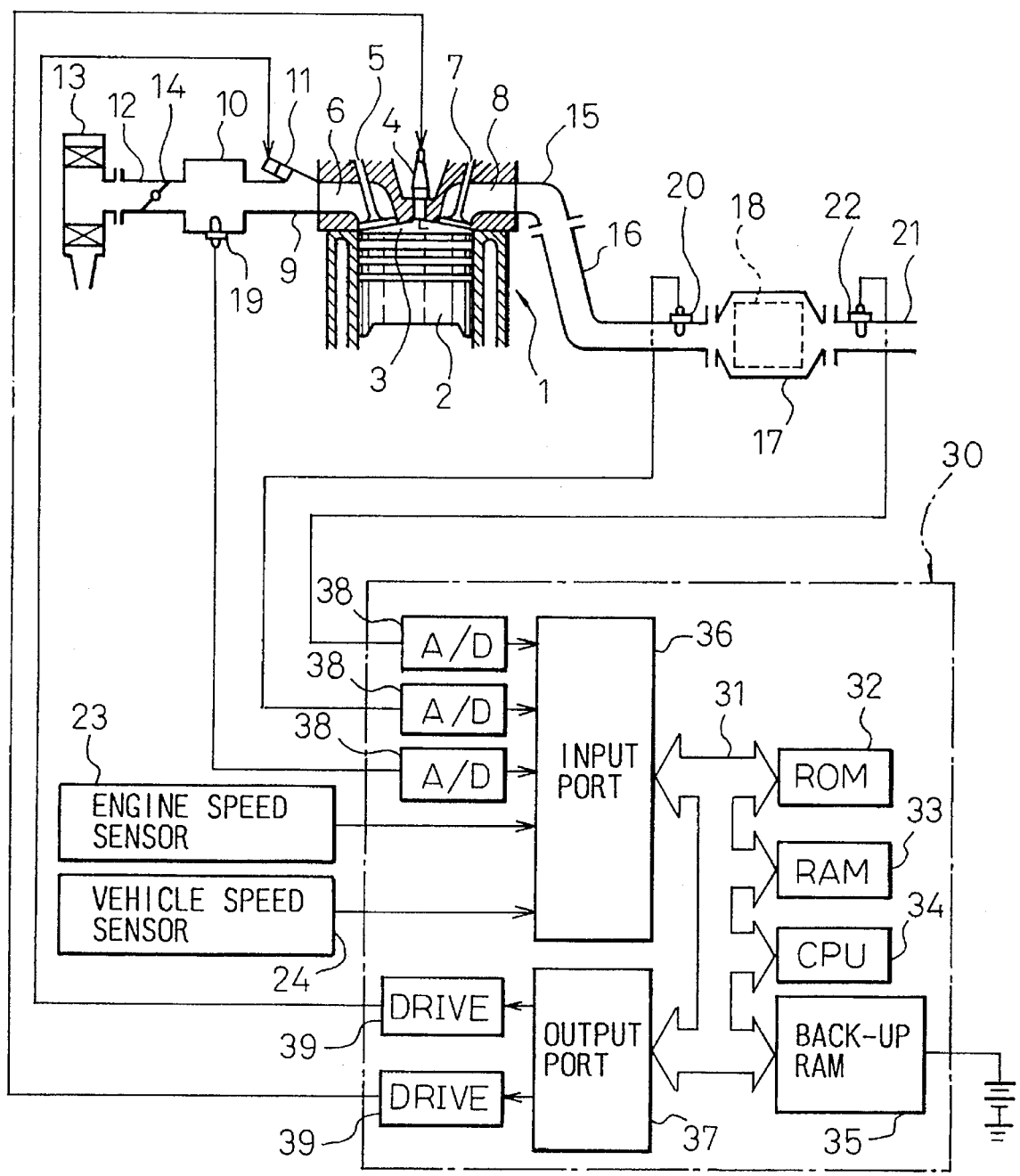
FIG. 1 is an overall view of an internal combustion engine.

Referring to FIG. 1, 1 is an engine body, 2 a piston, 3 a combustion chamber, 4 a spark plug, 5 an intake valve, 6 an intake port, 7 an exhaust valve, and 8 an exhaust port. The intake port 6 is communicated with a surge tank 10 through a corresponding branch pipe 9. Each branch pipe 9 has attached to it a fuel injector 11 for injecting fuel toward the inside of the corresponding intake port 6. The surge tank 10 is communicated to an air cleaner 13 through an intake duct 12. A throttle valve 14 is arranged inside the intake duct 12. On the other hand, the intake port 8 is connected with a casing 17 housing an exhaust purification element 18 through an exhaust manifold 15 and exhaust pipe 16. In this embodiment, the exhaust purification element 18 is a NOx absorbent.

An electronic control unit 30 is comprised of a digital computer which is provided with a read only memory (ROM) 32, random access memory (RAM) 33, microprocessor (CPU) 34, back-up RAM connected to a fixed power source, input port 36, and output port 37 connected to each other through a bidirectional bus 31. Inside the surge tank 10 is arranged a pressure sensor 19 for generating an output voltage proportional to the absolute pressure in the surge tank 10. The output voltage of the pressure sensor 19 is input to the input port 35 through a corresponding AD converter 38. In the exhaust pipe 21 downstream of the NOx absorbent 18 is arranged an oxygen concentration sensor (hereinafter referred to as an "$O_2$ sensor") 22, which $O_2$ sensor 22 is connected to the input port 36 through a corresponding AD converter 38. Further, connected to the input port 36 are an engine speed sensor 23 for generating an output pulse expressing the engine speed and a vehicle speed sensor 24 for generating an output pulse expressing the vehicle speed. On the other hand, the output port 37 is connected to the spark plug 4 and the fuel injector 11 through a corresponding drive circuit 39.

In the internal combustion engine shown in FIG. 1, basically the fuel injection time TAU is calculated based on the following equation:

$$TAU = TP \cdot K$$

Figure 2:
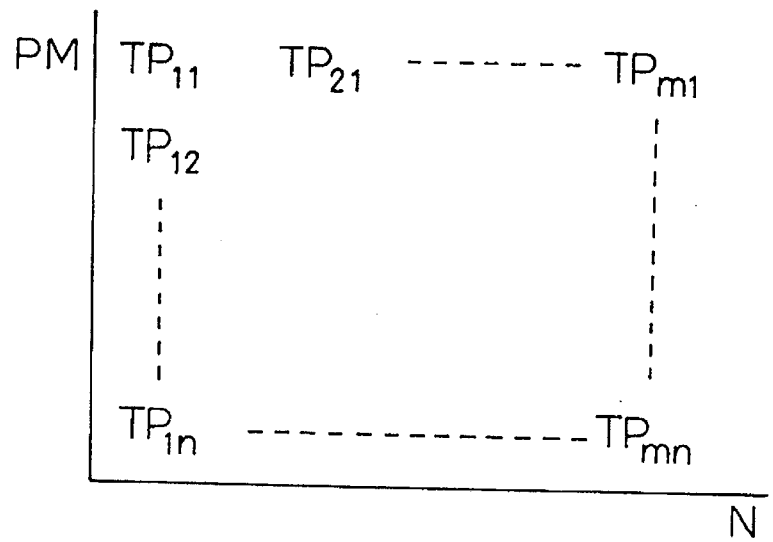
FIG. 2 is a view of a map of a basic fuel injection time.

Here, TP is the basic fuel injection time and K is a correction coefficient. The basic fuel injection time TP indicates the fuel injection time required for making the air-fuel ratio of the air-fuel mixture fed inside an engine cylinder the stoichiometric air-fuel ratio. This basic fuel injection time TP is found in advance by experiment and is stored in the advance in the ROM 32 in the form of a map as shown in FIG. 2 as a function of the absolute pressure PM inside the surge tank 10 and the engine speed N. The correction coefficient K is a coefficient for controlling the air-fuel ratio of the air-fuel mixture fed inside the engine cylinder. If K=1.0, the air-fuel mixture fed into the engine cylinder becomes the stoichiometric air-fuel ratio. As opposed to this, if K<1.0, the air-fuel ratio of the air-fuel mixture fed into the engine cylinder becomes larger than the stoichiometric air-fuel ratio, that is, becomes lean, while if K>1.0, the air-fuel ratio of the air-fuel mixture fed into the engine cylinder becomes smaller than the stoichiometric air-fuel ratio, that is, becomes rich.

Figure 3:
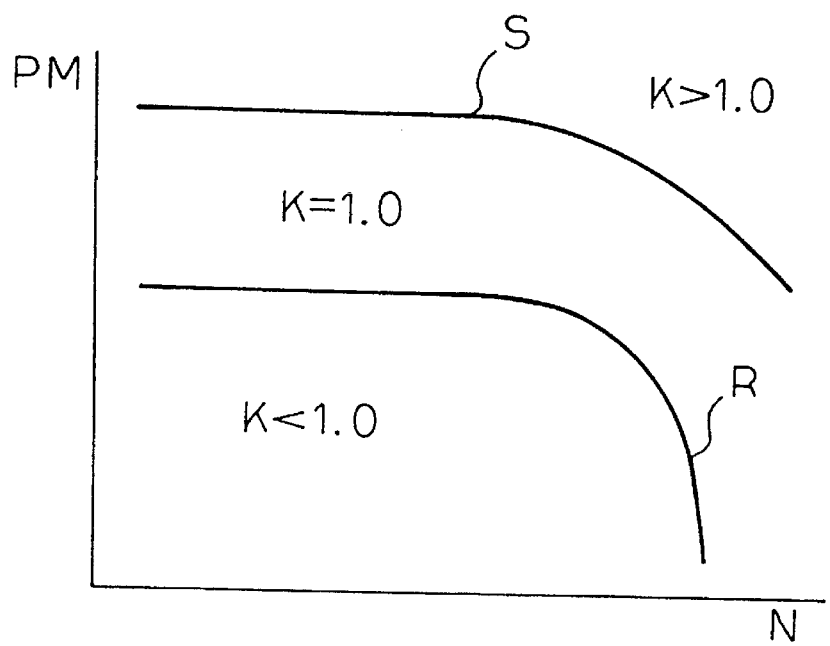
FIG. 3 is a view of a correction coefficient K.

The target air-fuel ratio of the air-fuel mixture to be fed inside the engine cylinder, that is, the value of the correction coefficient K, is changed in accordance with the state of operation of the engine. In the embodiment of the present invention, basically it is determined in advance as a function of the absolute pressure PM in the surge tank 10 and the engine speed N as shown in FIG. 3. That is, as shown in FIG. 3, in the low load operating region on the low load side from the solid line R, K<1.0, that is, the air-fuel mixture is made lean, in the high load operating region between the solid line R and the solid line S, K=1.0, that is, the air-fuel ratio of the air-fuel mixture is made the stoichiometric air-fuel ratio, and in the full load operating region at the high load side of the solid line S, K>1.0, that is, the air-fuel mixture is made rich.

Figure 4:
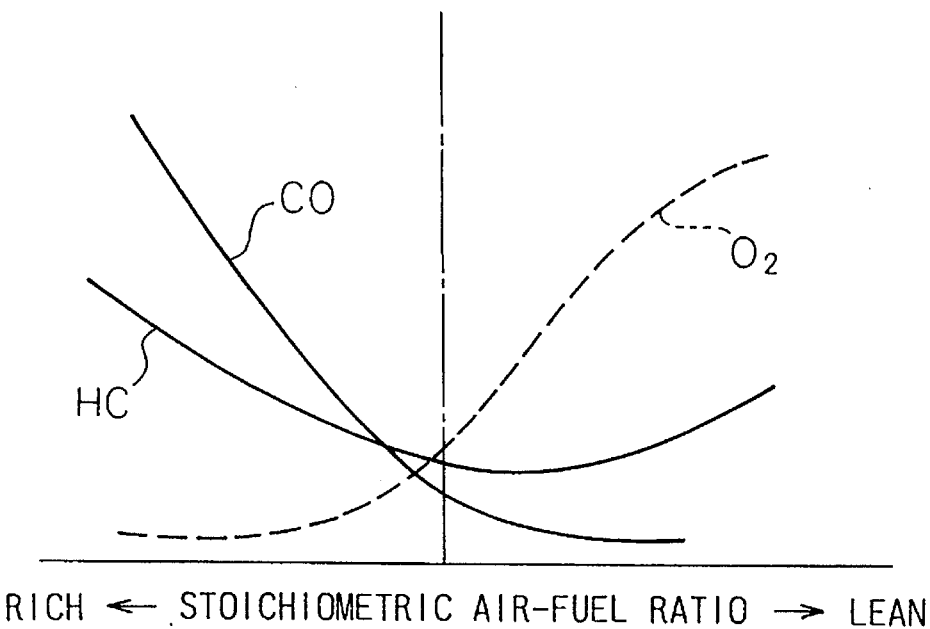
FIG. 4 is a graph showing schematically the concentrations of the unburnt HC, the CO, and the oxygen in exhaust gas discharged from an engine.

FIG. 4 schematically shows the concentrations of the typical components in exhaust gas discharged from the combustion chamber 3. As will be understood from FIG. 4, the concentrations of the unburnt HC and the CO in the exhaust gas discharged from the combustion chamber 3 increase the richer the air-fuel ratio of the air-fuel mixture fed in the combustion chamber 3. The concentration of the oxygen $O_2$ in the exhaust gas discharged from the combustion chamber 3 increases the leaner the air-fuel ratio of the air-fuel mixture fed into the combustion chamber 3.

The NOx absorbent 18 housed in the casing 17 for example uses alumina as a carrier and carries on that carrier a precious metal such as platinum Pt and at least one element selected from an alkali metal such as potassium K, sodium Na, lithium Li, and cesium Cs, an alkali earth such as barium Ba and calcium Ca, and a rare earth such as lanthanum La and yttrium Y. If the ratio of the air and fuel (hydrocarbons) fed inside the engine intake passage and the exhaust passage upstream of the NOx absorbent 18 is defined as the air-fuel ratio of the exhaust gas flowing into the NOx absorbent 18, the NOx absorbent 18 performs a NOx absorbing and release action wherein it absorbs NOx when the air-fuel ratio of the inflowing exhaust gas is lean and releases the absorbed NOx when the oxygen concentration in the inflowing exhaust gas falls. Note that when no fuel (hydrocarbons) or air is fed into the exhaust passage upstream of the NOx absorbent 18, the air-fuel ratio of the inflowing exhaust gas matches with the air-fuel ratio of the air-fuel mixture fed inside the combustion chamber 3. Accordingly, in that case, the NOx absorbent 18 absorbs the NOx when the air-fuel ratio of the air-fuel mixture fed in the combustion chamber 3 becomes lean and releases the absorbed NOx when the oxygen concentration in the air-fuel mixture fed in the combustion chamber 3 falls.

Figure 5A:
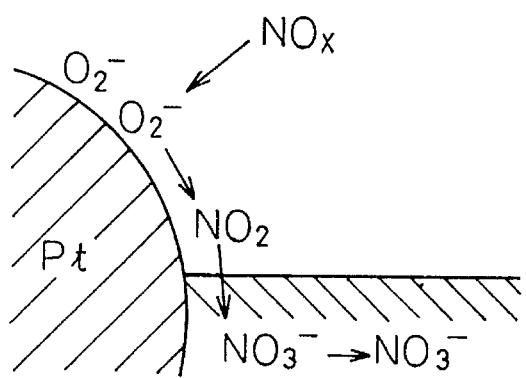
FIGS. 5A and 5B are views for explaining the intake and release action of NOx.
Figure 5B:
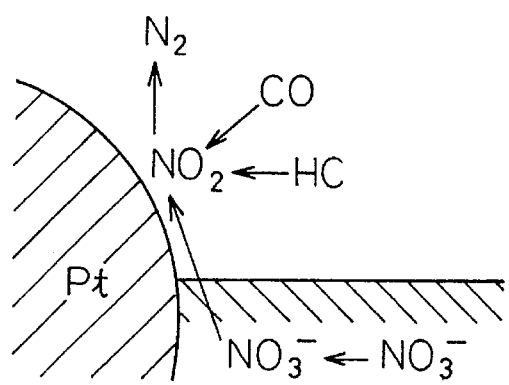

If the above NOx absorbent 18 is arranged in the engine exhaust passage, the NOx absorbent 18 actually performs a NOx absorption and release action, but parts of the detailed mechanism behind this absorption and release action are not clear. The absorption and release action, however, can be considered to be performed by the mechanism as shown in FIGS. 5A and 5B. Next, an explanation will be made of this mechanism taking as an example the case of carrying platinum Pt and barium Ba on the carrier, but the mechanism is similar even when using another precious metal, alkali metal, alkali earth, or rare earth.

That is, when the inflowing exhaust gas becomes considerably lean, the oxygen concentration in the inflowing exhaust gas increases by a large margin and, as shown in FIG. 5A, the oxygen $O_2$ adheres to the surface of the platinum Pt in the form of $O_2^-$ or $O^{2-}$. On the other hand, the NOx in the inflowing exhaust gas reacts with the $O_2^-$ or $O^{2-}$ on the surface of the platinum Pt to become $NO_2$ ($2NO+O_2 \rightarrow 2NO_2$). Next, part of the $NO_2$ which is produced is oxidized on the platinum Pt, absorbed in the absorbent, bonds with the barium oxide BaO, and is diffused inside the absorbent in the form of the nitrate ions $NO_3^-$ as shown in FIG. 5A. In this way, the NOx is absorbed in the NOx absorbent 18.

So long as the oxygen concentration in the exhaust gas is high, $NO_2$ is produced on the surface of the platinum Pt. So long as the NOx absorption capacity of the absorbent is not saturated, the $NO_2$ is absorbed in the absorbent and nitrate ions $NO_3^-$ are produced. As opposed to this, when the oxygen concentration in the inflowing exhaust gas falls and the amount of production of $NO_2$ falls, the reaction proceeds in the reverse direction ($NO_3^- \rightarrow NO_2$) and the nitrate ions $NO_3^-$ in the absorbent are released from the absorbent in the form of $NO_2$. That is, when the oxygen concentration in the inflowing exhaust gas falls, NOx is released from the NOx absorbent 18. As shown in FIG. 4, if the degree of leanness of the inflowing exhaust gas becomes lower, the oxygen concentration in the inflowing exhaust gas falls. Therefore, by lowering the degree of leanness of the inflowing exhaust gas, the NOx comes to be released from the NOx absorbent 18 even if the air-fuel ratio of the inflowing exhaust gas is lean.

On the other hand, if the air-fuel mixture fed in the combustion chamber 3 is made rich and the air-fuel ratio of the inflowing exhaust gas becomes rich, then, as shown in FIG. 4, a large amount of unburnt HC and CO are discharged from the engine. The unburnt HC and CO react with the oxygen $O_2^-$ or $O^{2-}$ on the platinum Pt and are oxidized. Further, when the air-fuel ratio of the inflowing exhaust gas becomes rich, the oxygen concentration in the inflowing exhaust gas falls tremendously, so the $NO_2$ is released from the absorbent. This $NO_2$, as shown in FIG. 5B, reacts with the unburnt HC and is reduced. In this way, when there is no longer any NOx present on the surface of the platinum Pt, the $NO_2$ is successively released from the absorbent. Accordingly, when the air-fuel ratio of the inflowing exhaust gas is made rich, the NOx is released from the NOx absorbent 18 in a short time.

That is, if the air-fuel ratio of the inflowing exhaust gas is made rich, first the unburnt HC and CO react immediately with the $O_2^-$ or $O^{2-}$ on the platinum Pt to be oxidized, then if there is still unburnt HC and CO left even after the $O_2^-$ or $O^{2-}$ on the platinum Pt is consumed, the NOx released from the absorbent and the NOx discharged from the engine are reduced by the unburnt HC and CO. Accordingly, if the air-fuel ratio of the inflowing exhaust gas is made rich, the NOx absorbed in the NOx absorbent 18 is released in a short period and the released NOx is reduced, so it becomes possible to prevent the NOx from being released into the atmosphere. Further, the NOx absorbent 18 has the function of a reduction catalyst, so even if the air-fuel ratio of the inflowing exhaust gas is made the stoichiometric air-fuel ratio, the NOx released from the NOx absorbent 18 is reduced. However, when the air-fuel ratio of the inflowing exhaust gas is made the stoichiometric air-fuel ratio, the NOx is released only gradually from the NOx absorbent 18, so it takes a somewhat long time for all of the NOx absorbed in the NOx absorbent 18 to be released.

In this way, when a lean air-fuel mixture is burned, the NOx is absorbed in the NOx absorbent 18. There is, however, a limit to the NOx absorbing ability of the NOx absorbent 18. When the NOx absorbing ability of the NOx absorbent 18 becomes saturated, the NOx absorbent 18 soon can no longer absorb the NOx. Accordingly, it is necessary to cause the NOx to be released from the NOx absorbent 18 before the NOx absorbing ability becomes saturated. Toward this end, it is necessary to estimate to what extent the NOx is absorbed in the NOx absorbent 18. An explanation will be made next of the method of detection of this amount of NOx absorption.

Figure 6A:
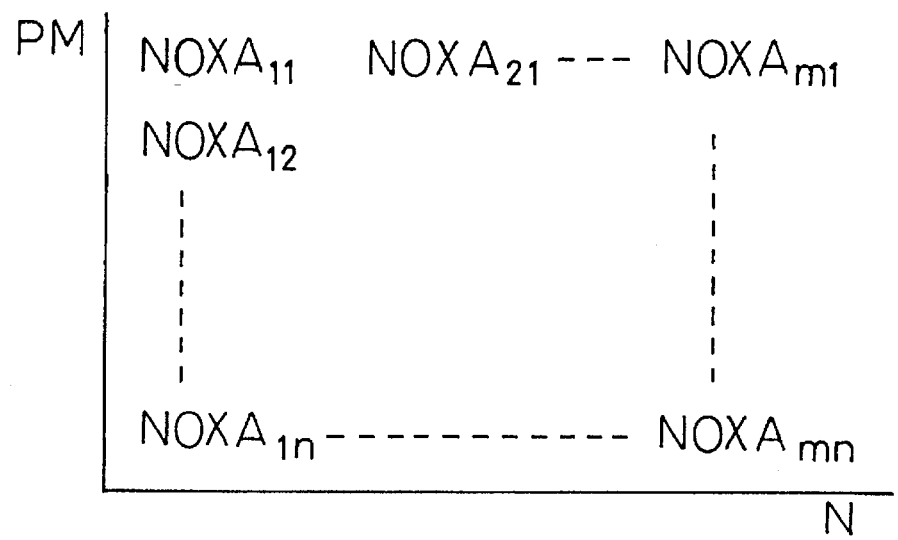
FIGS. 6A and 6B are views of, respectively, the amount of NOx intake NOXA and the amount of NOx release NOXD.

When a lean air-fuel mixture is burned, the amount of NOx discharged from an engine per unit time increases the higher the engine load, so the amount of NOx absorbed in the NOx absorbent 18 per unit time increases. Also, the amount of NOx discharged from the engine per unit time increases the higher the engine speed, so the amount of NOx absorbed in the NOx absorbent 18 per unit time again increases. Accordingly, the amount of NOx absorbed in the NOx absorbent 18 per unit time becomes a function of the engine load and engine speed. In this case, the engine load may be represented by the absolute pressure in the surge tank 10, so the amount of NOx absorbed in the NOx absorbent 18 per unit time becomes a function of the absolute pressure PM inside the surge tank 10 and the engine speed N. Therefore, the amount of NOx absorbed in the NOx absorbent 18 becomes a function of the absolute pressure PM in the surge tank 10 and the engine speed N. Accordingly, in this embodiment of the present invention, the amount of NOx NOXA absorbed in the NOx absorbent 18 per unit time is found in advance by experiment as a function of the absolute pressure PM and the engine speed N and the NOx amount NOXA is stored in advance in the ROM 32 in the form of a map as shown in FIG. 6A as a function of PM and N.

Figure 6B:
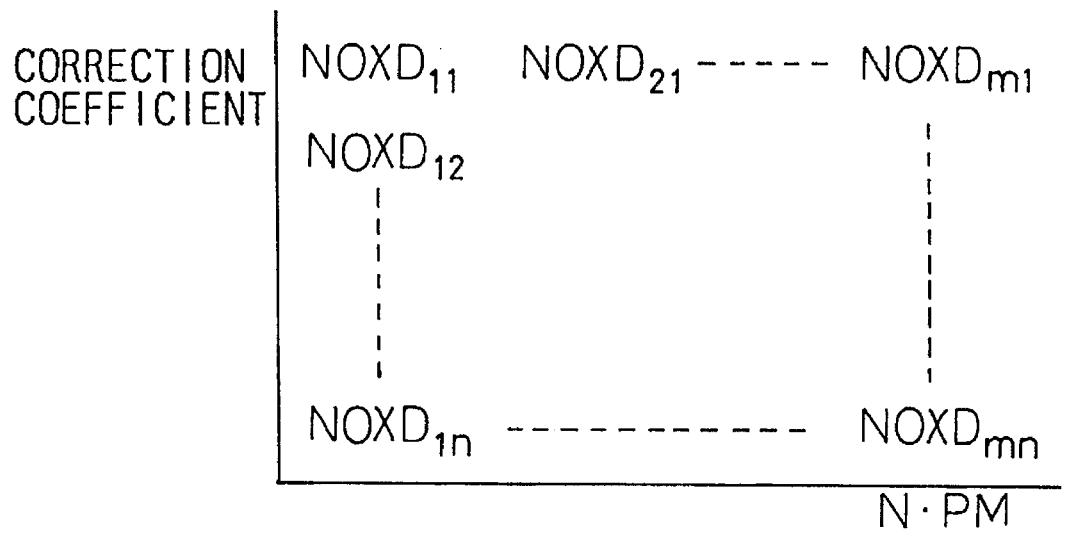
Figure 7A:
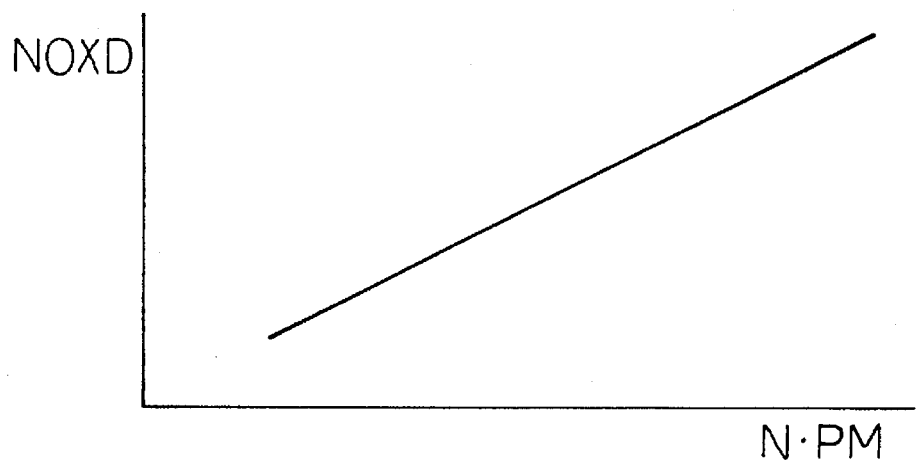
FIGS. 7A and 7B are views of the amount of NOx release NOXD.
Figure 7B:
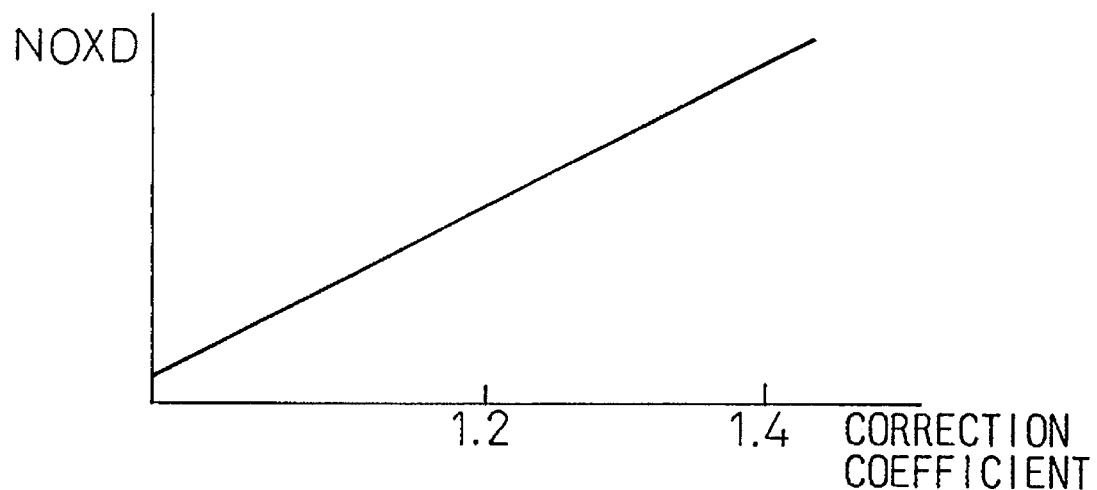

On the other hand, when the air-fuel ratio of the air-fuel mixture fed in the engine cylinder becomes the stoichiometric air-fuel ratio or rich, the NOx is released from the NOx absorbent 18, but the amount of release of NOx at this time is mainly affected by the amount of the exhaust gas and the air-fuel ratio. That is, the more the amount of exhaust gas increases, the more the amount of NOx released from the NOx absorbent 18 per unit time increases, while the richer the air-fuel ratio, the more the amount of NOx released from the NOx absorbent 18 per unit time increases. In this case, the amount of the exhaust gas, that is, the amount of the intake air, can be represented by the product of the engine speed N and the absolute pressure PM in the surge tank 10. Accordingly, as shown in FIG. 7A, the amount of NOx NOXD released from the NOx absorbent 18 per unit time increases the greater the N·PM. Further, the air-fuel ratio corresponds to the value of the correction coefficient K, so as shown in FIG. 7B, the amount of NOx NOXD released from the NOx absorbent 18 per unit time increases the greater the value of K. The amount of NOx NOXD released from the NOx absorbent 18 per unit time is stored in advance in the ROM 32 in the form of the map shown in FIG. 6B as a function of N·PM.

As explained above, when a lean air-fuel mixture is burned, the amount of NOx absorbed per unit time is expressed by NOXA and when an air-fuel mixture of the stoichiometric air-fuel ratio or a rich air-fuel mixture is burned, the amount of NOx released per unit time is expressed by NOXD, so the amount of NOx ΣNOX estimated to be absorbed in the NOx absorbent 18 is expressed by the following equation:

$$\Sigma NOX = \Sigma NOX + NOXA - NOXD$$

Figure 8:
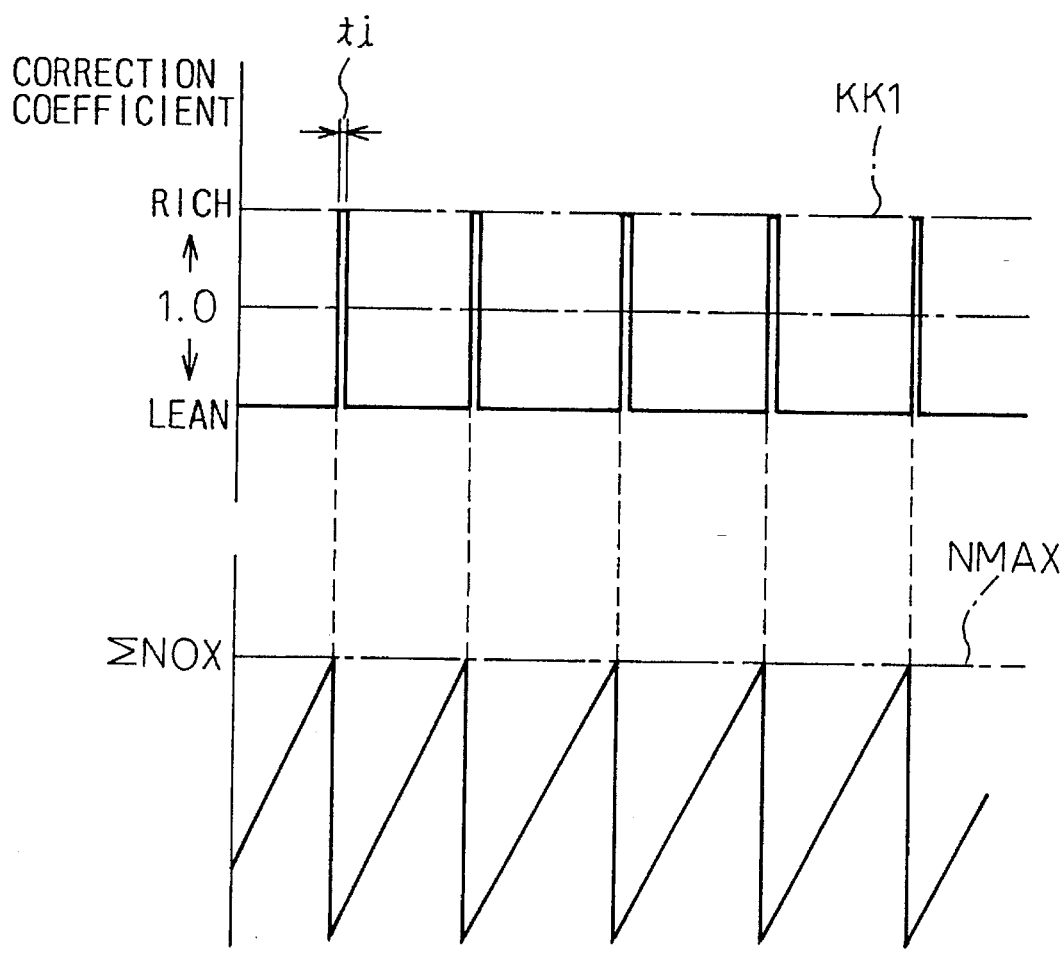
FIG. 8 is a time chart of the air-fuel ratio control.

Therefore, in this embodiment of the present invention, as shown in FIG. 8, when the amount of NOx ΣNOX estimated to be absorbed in the NOx absorbent 18 reaches the maximum allowable value NMAX, the correction coefficient for the basic fuel injection time TP is made KK1 (>1.0) for the time $t_i$, that is, the air-fuel ratio of the air-fuel mixture is made rich temporarily for the time $t_i$, whereby the NOx is made to be released from the NOx absorbent 18.

SOx is, however, included in the exhaust gas. Not only the NOx, but also the SOx are absorbed in the NOx absorbent 18. The mechanism of absorption of SOx in the NOx absorbent 18 is considered to be the same as the mechanism of absorption of the NOx.

That is, explaining this taking as an example the case of platinum Pt and barium Ba carried on a carrier in the same way as when explaining the mechanism of absorption of NOx, as explained above, when the air-fuel ratio of the inflowing exhaust gas is lean, the oxygen $O_2$ adheres to the surface of the platinum Pt in the form of $O_2^-$ or $O^{2-}$ and the $SO_2$ in the inflowing exhaust gas reacts with the $O_2^-$ or $O^{2-}$ on the surface of the platinum Pt and becomes $SO_3$. Next, part of the $SO_3$ produced is absorbed in the absorbent while being further oxidized on the platinum Pt and diffuses in the absorbent in the form of sulfate ions $SO_4^{2-}$ while bonding with the barium oxide BaO to produce a stable sulfate $BaSO_4$.

This sulfate $BaSO_4$, however, is stable and difficult to decompose. Even if the air-fuel ratio of the air-fuel mixture is made rich for the short time $t_i$ such as shown in FIG. 8, almost all of the sulfate $BaSO_4$ will not be decomposed and will remain as it is. Accordingly, the sulfate $BaSO_4$ increases in the NOx absorbent 18 along with the passage of time and therefore the amount of NOx which can be absorbed by the NOx absorbent 18 gradually falls along with the passage of time. That is, in other words, the NOx absorbent 18 gradually deteriorates along with the passage of time. If the NOx absorbent 18 deteriorates, the amount of NOx which can be absorbed by the NOx absorbent 18 falls, so some sort of countermeasure is required. Accordingly, it is necessary to detect the degree of deterioration of the NOx absorbent 18. Therefore, next, an explanation will be made of the method of detection of the degree of deterioration of the NOx absorbent 18 according to the present invention.

When the air-fuel ratio of the exhaust gas flowing into the NOx absorbent 18 is changed from lean to rich, that is, in this embodiment of the present invention, when the air-fuel ratio of the air-fuel mixture is changed from lean to rich, as mentioned above, the NOx is released from the NOx absorbent 18. At this time, the amount of NOx released from the NOx absorbent 18 is proportional to the amount of unburnt HC and CO in the exhaust gas and an amount of NOx able to provide all of the oxygen needed for oxidizing all of the unburnt HC and CO in the exhaust gas is released from the NOx absorbent 18. Accordingly, at this time, all of the unburnt HC and CO in the exhaust gas are oxidized by the oxygen in the NOx released from the NOx absorbent 18 and, on the other hand, all of the NOx released from the NOx absorbent 18 is reduced. Therefore, at this time, the air-fuel ratio of the exhaust gas flowing out from the NOx absorbent 18 becomes substantially the stoichiometric air-fuel ratio.

Next, when all of the NOx is released from the NOx absorbent 18, the unburnt HC and the CO in the exhaust gas pass through the NOx absorbent 18 without being oxidized and therefore the air-fuel ratio of the exhaust gas flowing out from the NOx absorbent 18 becomes rich. That is, if the air-fuel ratio of the exhaust gas flowing into the NOx absorbent 18 is changed from lean to rich, the air-fuel ratio of the exhaust gas flowing out from the NOx absorbent 18 is maintained substantially at the stoichiometric air-fuel ratio during the time when the NOx is being released from the NOx absorbent 18. When the action of releasing NOx from the NOx absorbent 18 ends, the air-fuel ratio of the exhaust gas flowing out from the NOx absorbent 18 becomes rich.

As mentioned above, however, the amount of NOx which can be absorbed by the NOx absorbent 18 gradually falls along with the deterioration of the NOx absorbent 18 and accordingly the time during which the air-fuel ratio of the exhaust gas flowing out from the NOx absorbent 18 is maintained substantially at the stoichiometric air-fuel ratio when the air-fuel ratio of the exhaust gas flowing into the NOx absorbent 18 is changed from lean to rich gradually becomes shorter. This will be explained next with reference to FIG. 9.

Figure 9:
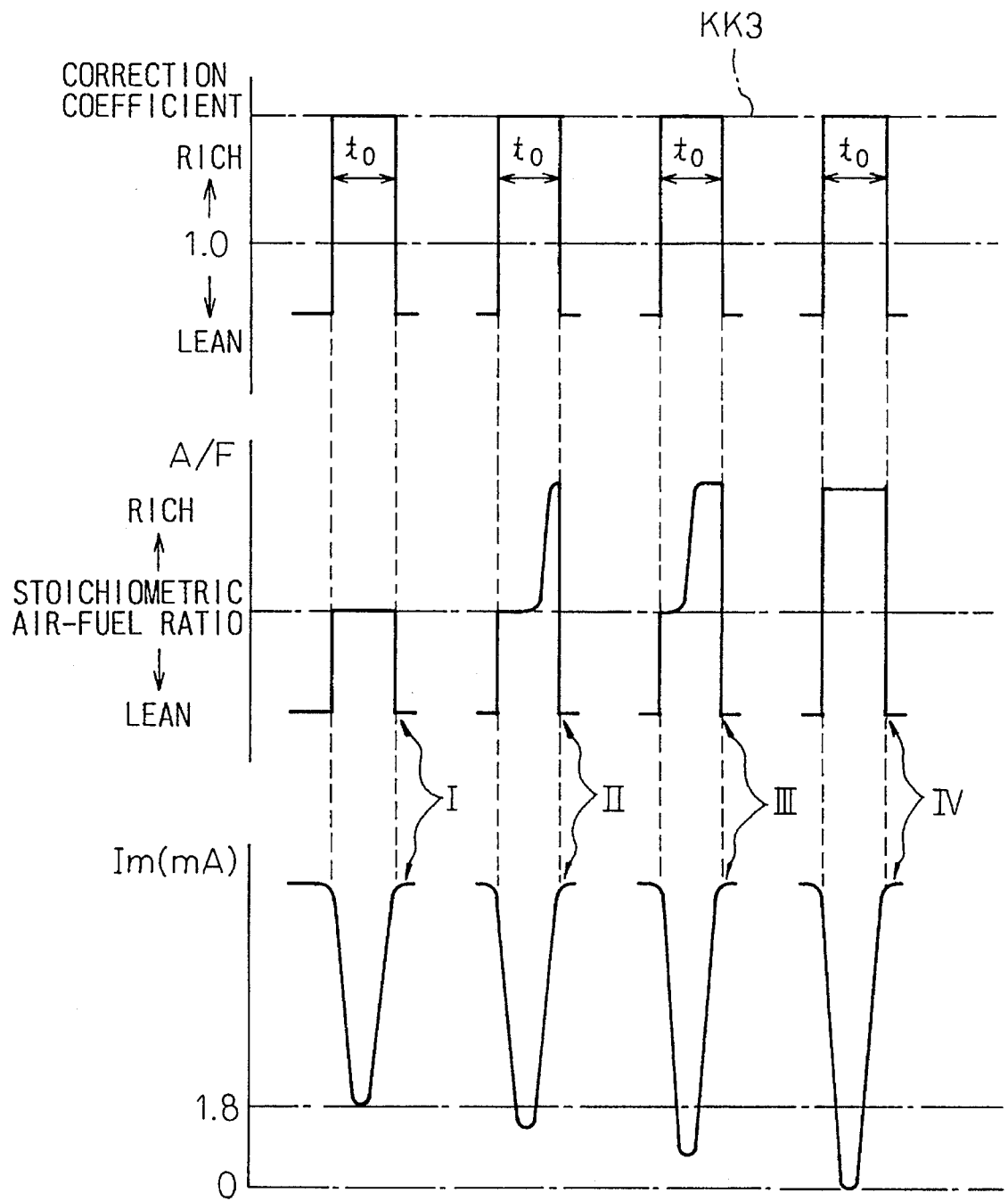
FIG. 9 is a view for explaining a method of detection of deterioration of a NOx absorbent.

FIG. 9 shows, by A/F, the changes in the air-fuel ratio of the exhaust gas flowing out from the NOx absorbent 18 when the correction coefficient with respect to the basic fuel injection time TP is made KK3 (>1.0) for a predetermined fixed time $t_o$, that is, when the air-fuel ratio of the air-fuel mixture is made rich for a predetermined fixed time $t_o$. Note that in FIG. 9, I indicates when the NOx absorbent 18 is new, II indicates when the NOx absorbent 18 has deteriorated slightly, III indicates when the NOx absorbent 18 has further deteriorated, and IV indicates when the NOx absorbent 18 has completely deteriorated. As shown in FIG. 9, along with the deterioration of the NOx absorbent 18, the time during which the air-fuel ratio A/F of the exhaust gas is maintained substantially at the stoichiometric air-fuel ratio gradually becomes shorter. When the NOx absorbent 18 completely deteriorates, the air-fuel ratio A/F of the exhaust gas is no longer maintained at the stoichiometric air-fuel ratio at all. Accordingly, by detecting the time during which the air-fuel ratio A/F of the exhaust gas is maintained substantially at the stoichiometric air-fuel ratio, the degree of deterioration of the NOx absorbent 18 can be detected, but the time during which the air-fuel ratio A/F of the exhaust gas is maintained substantially at the stoichiometric air-fuel ratio is normally an extremely short time of less than 1 second. If the degree of deterioration of the NOx absorbent 18 is calculated from such a short time, the error becomes larger and thus there is the problem that degree of deterioration of the NOx absorbent 18 cannot be accurately judged. Further, sometimes the air-fuel ratio A/F of the exhaust gas becomes rich in a spike-like manner due to some reason or another when the air-fuel ratio A/F of the exhaust gas is maintained substantially at the stoichiometric air-fuel ratio. When such a "rich spike" occurs, the degree of deterioration of the NOx absorbent 18 is completely erroneously judged.

Whatever the case, it is inherently difficult to judge the degree of deterioration of a NOx absorbent 18 from the tiny changes in the air-fuel ratio AF of exhaust gas in an internal combustion engine, where the air-fuel ratio of the exhaust gas fixedly fluctuates. In such a case, it is necessary to analyze fluctuations in the air-fuel ratio A/F from a somewhat broader angle where there is no major effect on the judgement of the degree of deterioration of the NOx absorbent 18. That is, as will be understood from FIG. 9, if the degree of deterioration of the NOx absorbent 18 progresses, the overall pattern of change of the air-fuel ratio A/F of the exhaust gas changes. This overall pattern of change does not change much at all regardless of whether a "rich spike" is caused or is not caused. Accordingly, if the degree of deterioration of the NOx absorbent 18 is judged from this overall pattern of change, it becomes possible to relatively accurately judge the degree of deterioration of the NOx absorbent 18.

As an actual problem, however, it is difficult to judge which pattern of change from I to IV of FIG. 9 the pattern of change of the exhaust gas corresponds to. Therefore, the inventors engaged in studies and as a result discovered that if an $O_2$ sensor 22 which produces a current or voltage proportional to the oxygen concentration in the exhaust gas is arranged in the exhaust passage downstream of the NOx absorbent 18, the $O_2$ sensor 22 produces a current or voltage corresponding to the pattern of change of the air-fuel ratio A/F of the exhaust gas.

Figure 10:
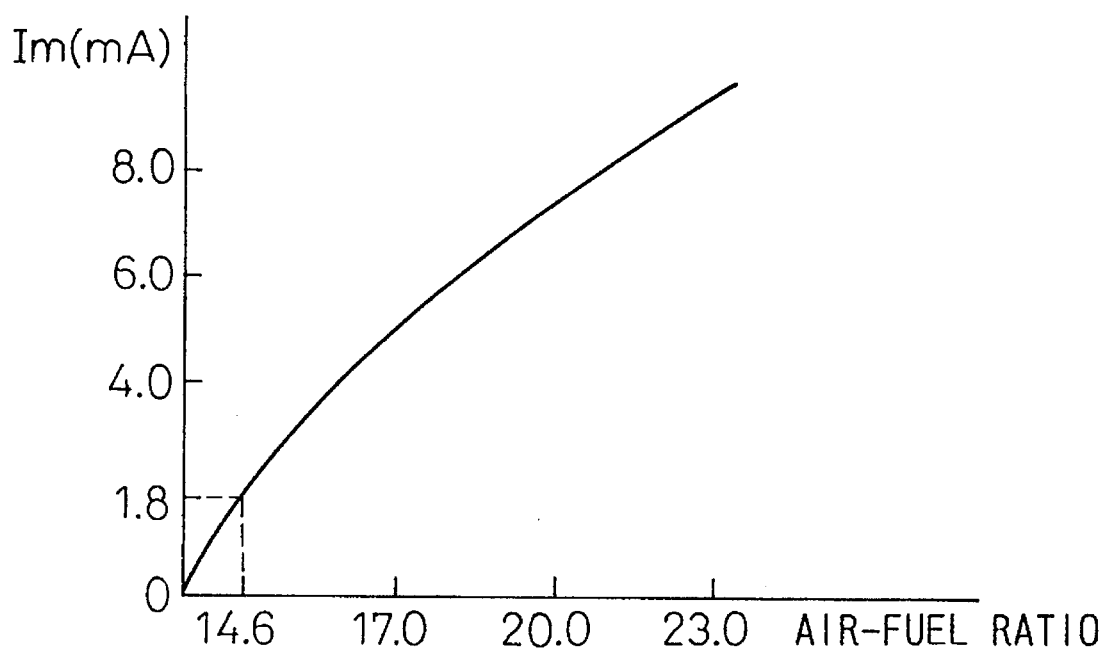
FIG. 10 is a view of the current flowing across an anode and cathode of an $O_2$ sensor.

This $O_2$ sensor 22 is comprised of a cup-shaped tubular body made of zirconia on the inside surface and outside surface of which are formed, respectively, an anode and cathode comprised of platinum thin films. The cathode is covered by a porous layer. A fixed voltage is applied across the anode and cathode. FIG. 10 shows the relationship between the air-fuel ratio of the exhaust gas contacting the $O_2$ sensor 22 and the current $I_m$ (mA) flowing across the anode and cathode. As shown in FIG. 10, in this $O_2$ sensor 22, the larger the air-fuel ratio of the exhaust gas, the greater the current $I_m$ (mA). Note that in this $O_2$ sensor 22, when the air-fuel ratio of the exhaust gas is the stoichiometric air-fuel ratio (=14.6), a current of about 1.8 mA flows. When the air-fuel ratio of the exhaust gas becomes richer than a certain degree, the current $I_m$ (mA) becomes zero.

This $O_2$ sensor 22 is arranged in the exhaust passage downstream of the NOx absorbent 18. As shown in FIG. 9, if the air-fuel ratio of the air-fuel mixture is made rich for a fixed time $t_o$, as shown in FIG. 9, the minimum value of the current $I_m$ (mA) of the $O_2$ sensor 22, that is, the peak value, becomes smaller the greater the degree of deterioration of the NOx absorbent 18. That is, when the NOx absorbent 18 is new, as shown by I, the minimum peak value of the current $I_m$ becomes about 1.8 mA. As shown by II and III, the minimum peak value gradually becomes smaller along with the deterioration of the NOx absorbent 18. As shown by IV, the minimum peak value of the current $I_m$ becomes zero when the NOx absorbent 18 completely deteriorates.

The minimum peak value of the current $I_m$ becomes smaller the shorter the time the air-fuel ratio A/F of the exhaust gas is substantially the stoichiometric air-fuel ratio, that is, the longer the time during which the air-fuel ratio A/F of the exhaust gas is rich. Accordingly, the minimum peak value of the current $I_m$ corresponds to the pattern of change of the air-fuel ratio A/F of the exhaust gas. Of course, even if there is a "rich spike" in the air-fuel ratio A/F of the exhaust gas, there is almost no effect on the minimum peak value of the current $I_m$ and accordingly the degree of deterioration of the NOx absorbent 18 can be detected considerably accurately.

Figure 11A:
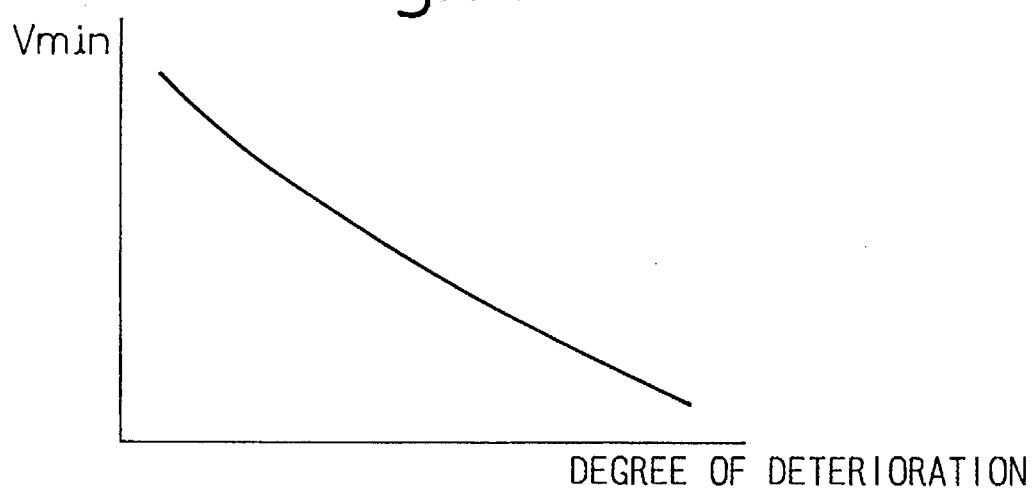
FIGS. 11A, 11B, and 11C are views of the degree of deterioration etc.

In the embodiment of FIG. 1, the current $I_m$ flowing across the anode and cathode of the $O_2$ sensor 22 is converted to voltage in the $O_2$ sensor 22 and that voltage is input through a corresponding AD converter 38 to the input port 36. In the electronic control unit 30, the minimum peak voltage $V_{min}$ corresponding to the minimum peak value of the current $I_m$ shown in FIG. 9 is calculated from this voltage. As shown in FIG. 11A, the smaller the minimum peak voltage $V_{min}$, the greater the degree of deterioration of the NOx absorbent 18 that is judged.

Figure 11B:
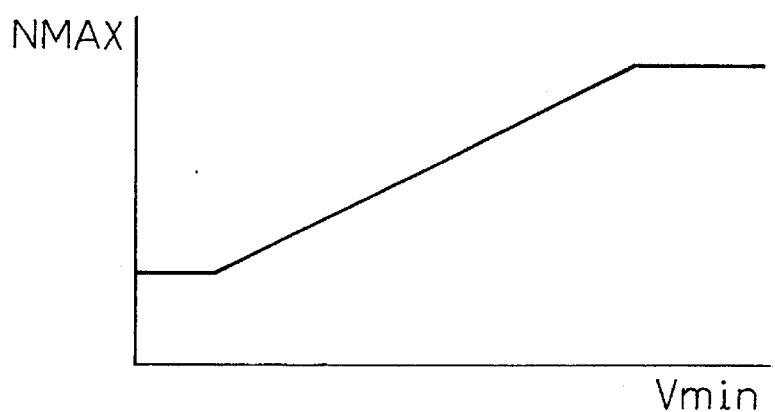
Figure 11C:
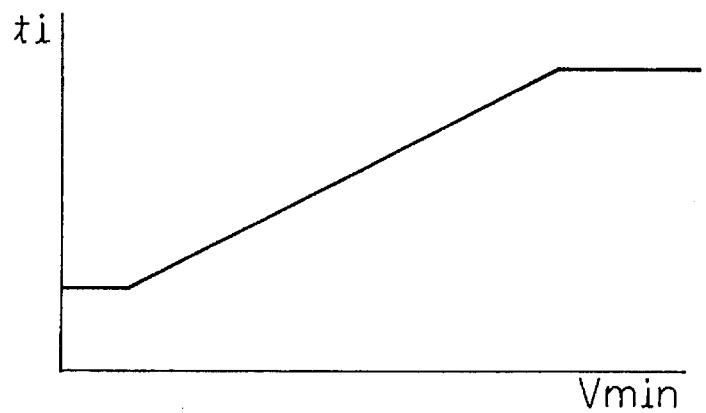

Further, in this embodiment of the present invention, the maximum allowable value NMAX with respect to the amount of NOx ΣNOX and the rich time $t_i$ for release of NOx are controlled based on the minimum peak voltage $V_{min}$. That is, the large the degree of deterioration of the NOx absorbent 18, the smaller the amount of NOx which can be absorbed by the NOx absorbent 18 and accordingly the larger the degree of deterioration of the NOx absorbent 18, the shorter the time during which the air-fuel ratio of the air-fuel mixture is made rich so as to release the NOx must be made. Therefore, in this embodiment of the present invention, as shown in FIG. 11B, the maximum allowable value NMAX is made smaller along with the minimum peak voltage $V_{min}$ becoming smaller. Further, the larger the degree of deterioration of the NOx absorbent 18, the smaller the amount of NOx absorbed, so as shown in FIG. 11C, the rich time $t_i$ for release of NOx is made shorter along with the minimum peak voltage $V_{min}$ becoming smaller.

In this embodiment of the present invention, the degree of deterioration of the NOx absorbent 18 is detected each time for example the vehicle travels 2 to 3 km. The maximum allowable value NMAX and the rich time $t_i$ are updated based on the results of the detection. Further, in this embodiment of the present invention, when the degree of deterioration of the NOx absorbent 18 exceeds a limit, the air-fuel ratio of the air-fuel mixture is made rich and the release of the SOx from the NOx absorbent 18 is caused. Note that even when the air-fuel ratio of the air-fuel mixture is made rich, the SOx is released from the NOx absorbent 18 only a small amount at a time. Accordingly, when the SOx should be released from the NOx absorbent 18, the air-fuel ratio of the air-fuel mixture is made rich over a considerably long period.

Figure 12:
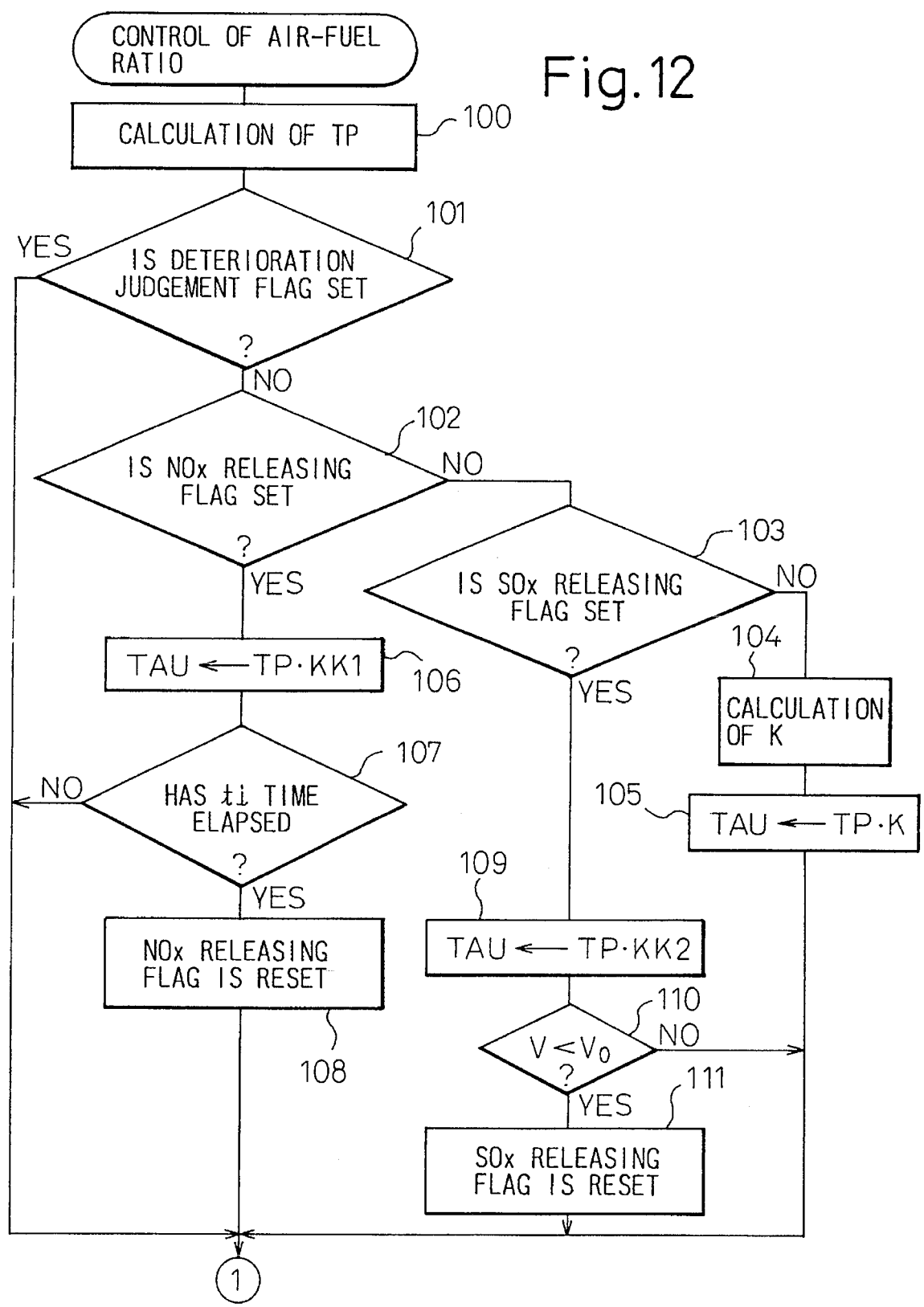
FIGS. 12 and 13 are flow charts for the control of the air-fuel ratio.
Figure 13:
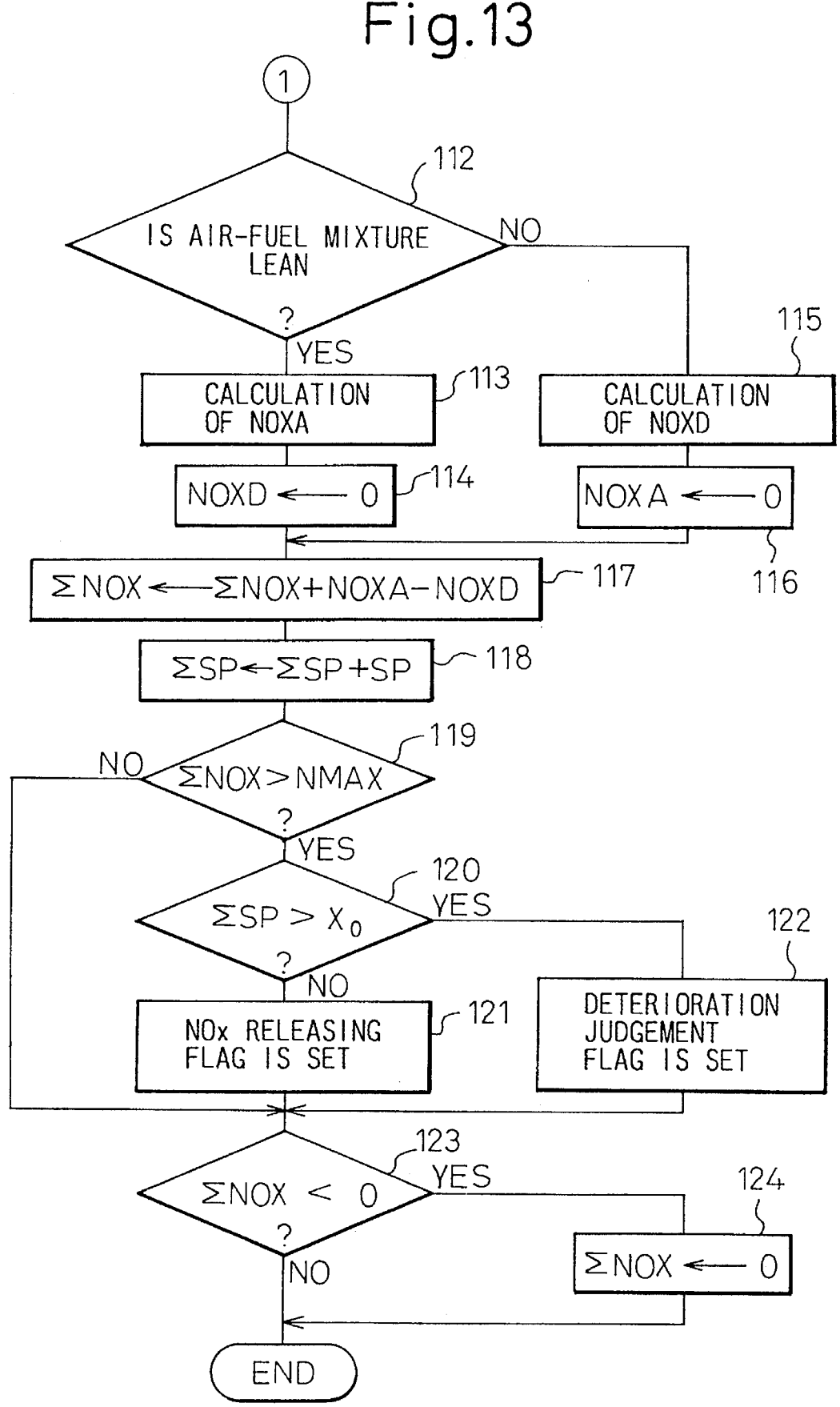

FIG. 12 and FIG. 13 show the routine for control of the air-fuel ratio. This routine is executed by interruption every fixed time period, for example.

Referring to FIG. 12 and FIG. 13, first, at step 100, the basic fuel injection time TP is calculated based on the relationship shown in FIG. 2. Next, at step 101, it is judged if a deterioration judgement flag showing that the deterioration of the NOx absorbent 18 should be judged is set or not. When the deterioration judgement flag has not been set, the routine proceeds to step 102, where it is judged if a NOx releasing flag showing that the NOx should be released from the NOx absorbent 18 is set or not. When the NOx releasing flag has not been set, the routine proceeds to step 103, where it is judged if an SOx releasing flag showing that the SOx should be released from the NOx absorbent 18 is set or not. When the SOx releasing flag has not been set, the routine proceeds to step 104.

At step 104, the correction coefficient K is calculated based on the relationship shown in FIG. 3 based on the operating state of the engine. Next, at step 105, the correction coefficient K is multiplied with the basic fuel injection time TP to calculate the fuel injection time TAU (=TP·K). Next, at step 112, it is judged if a lean air-fuel mixture is currently being burned. When a lean air-fuel mixture is being burned, the routine proceeds to step 113, where the amount of NOx absorbed NOXA per unit time is calculated based on FIG. 6A. Next, the routine proceeds to step 114, where the amount of NOx released is made zero. Next, the routine proceeds to step 117. As opposed to this, when it is judged at step 112 that an air-fuel mixture of the stoichiometric air-fuel ratio or a lean air-fuel mixture is currently being burned, the routine proceeds to step 115, where the amount of NOx released per unit time is calculated based on FIG. 6B. Next, the routine proceeds to step 116, where the amount of NOx absorbed NOXA is made zero. The routine then proceeds to step 117.

At step 117, the amount of NOx ΣNOX which is absorbed in the NOx absorbent 18 is calculated based on the following equation:

$$\Sigma NOX \leftarrow \Sigma NOX + NOXA - NOXD$$

Next, at step 118, the current vehicle speed SP is added to ΣSP. This ΣSP shows the cumulative running distance of the vehicle. Next, at step 119, it is judged if the amount of NOx ΣNOX has become larger than the maximum allowable value NMAX. When ΣNOX≦NMAX, the routine jumps to step 123, where it is judged if the amount of NOx ΣNOX has become negative. When ΣNOX<0, the routine proceeds to step 124, where the ΣNOX is made zero, then the processing cycle is ended.

On the other hand, when it is judged at step 119 that ΣNOX>NMAX, the routine proceeds to step 120, where it is judged if the cumulative running distance ΣSP is larger than the set value $X_o$. When ΣSP<$X_o$, the routine proceeds to step 121, where the NOx releasing flag is set. When the NOx releasing flag is set, at the next processing cycle, the routine proceeds from step 102 to step 106, where the correction coefficient KK1 (>1.0) is multiplied with the basic fuel injection time TP to calculate the fuel injection time TAU. Next, at step 107, it is judged if the time $t_i$ has elapsed. When the time $t_i$ has elapsed, the routine proceeds to step 108, where the NOx releasing flag is reset. Accordingly, while ΣSP<$X_o$, as shown in FIG. 8, the air-fuel ratio of the air-fuel mixture is made rich for the time $t_i$ each time ΣNOX>NMAX. During this time, NOx is released from the NOx absorbent 18.

On the other hand, when it is judged at step 119 that ΣNOX>NMAX and the routine proceeds to step 120 and when it is judged at step 120 that ΣSP>$X_o$, the routine proceeds to step 122, where the deterioration judgement flag is set. If the deterioration judgement flag is set, in the routine shown in FIG. 14, a judgement is made of the deterioration of the NOx absorbent 18.

Figure 14:
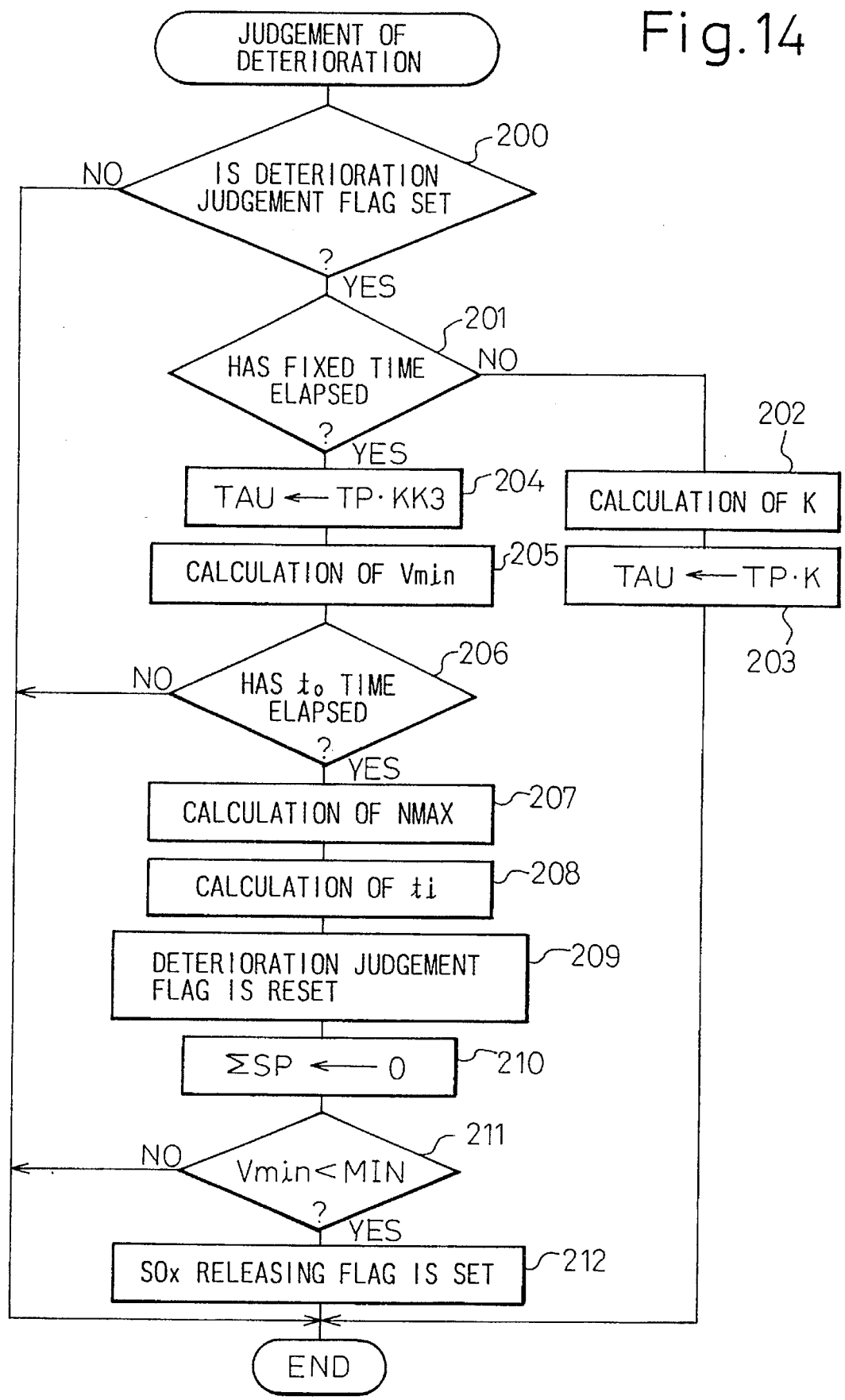
FIG. 14 is a flow chart for the judgement of the deterioration.

That is, FIG. 14 shows the routine for judgement of deterioration which is executed every fixed time period. First, at step 200, it is judged if the deterioration judgement flag has been set. If the deterioration judgement flag has been set, the routine proceeds to step 201, where it is judged if a fixed time has elapsed from when the deterioration judgement flag was set. That is, the NOx releasing flag is set when ΣNOX>NMAX, but normally the NOx absorption capability of the NOx absorbent 18 is still not saturated. Accordingly, at step 201, it is waited until a fixed time elapses until the NOx absorption capability of the NOx absorbent 18 definitely becomes saturated. When the fixed time has not elapsed, the routine proceeds to step 202, where the correction coefficient K is calculated from FIG. 3, then the routine proceeds to step 203, where the fuel injection time TAU (=TP·K) is calculated. Accordingly, at this time, the air-fuel ratio of the air-fuel mixture becomes the air-fuel ratio determined by the operating state of the engine.

On the other hand, when it is judged at step 201 that the fixed time has elapsed, the routine proceeds to step 204, where the correction coefficient KK3 (>1.0) is multiplied with the basic fuel injection time TP to calculate the fuel injection time TAU (=TP·KK3). Next, at step 205, the minimum peak value $V_{min}$ of the output voltage of the $O_2$ sensor 22 is calculated. Next, at step 206, it is judged if the fixed time $t_o$ has elapsed. When the fixed time $t_o$ has not elapsed, the processing cycle ends. Accordingly, at this time, as shown in FIG. 9, the air-fuel ratio of the air-fuel mixture is made rich for a fixed time $t_o$ and the minimum peak value $V_{min}$ corresponding to the minimum peak value of the current $I_m$ (mA) during this time is calculated. Accordingly, it becomes possible to calculate the degree of deterioration of the NOx absorbent 18 from the minimum peak voltage $V_{min}$.

When it is judged at step 206 that the fixed time $t_o$ has elapsed, the routine proceeds to step 207, where the maximum allowable value NMAX is calculated from the relationship shown in FIG. 11B based on the minimum peak voltage $V_{min}$. Next, the routine proceeds to step 208, where the rich time $t_i$ is calculated from the relationship shown in FIG. 11C based on the minimum peak voltage $V_{min}$. That is, the maximum allowable value NMAX and the rich time $t_i$ are updated. Next, at step 209, the deterioration judgement flag is reset, then at step 210, the cumulative running distance ΣSP is made zero. Next, at step 211, it is judged if the minimum peak voltage $V_{min}$ becomes smaller than the limit MIN. When $V_{min}$≧MIN, the processing cycle is ended.

Figure 15:
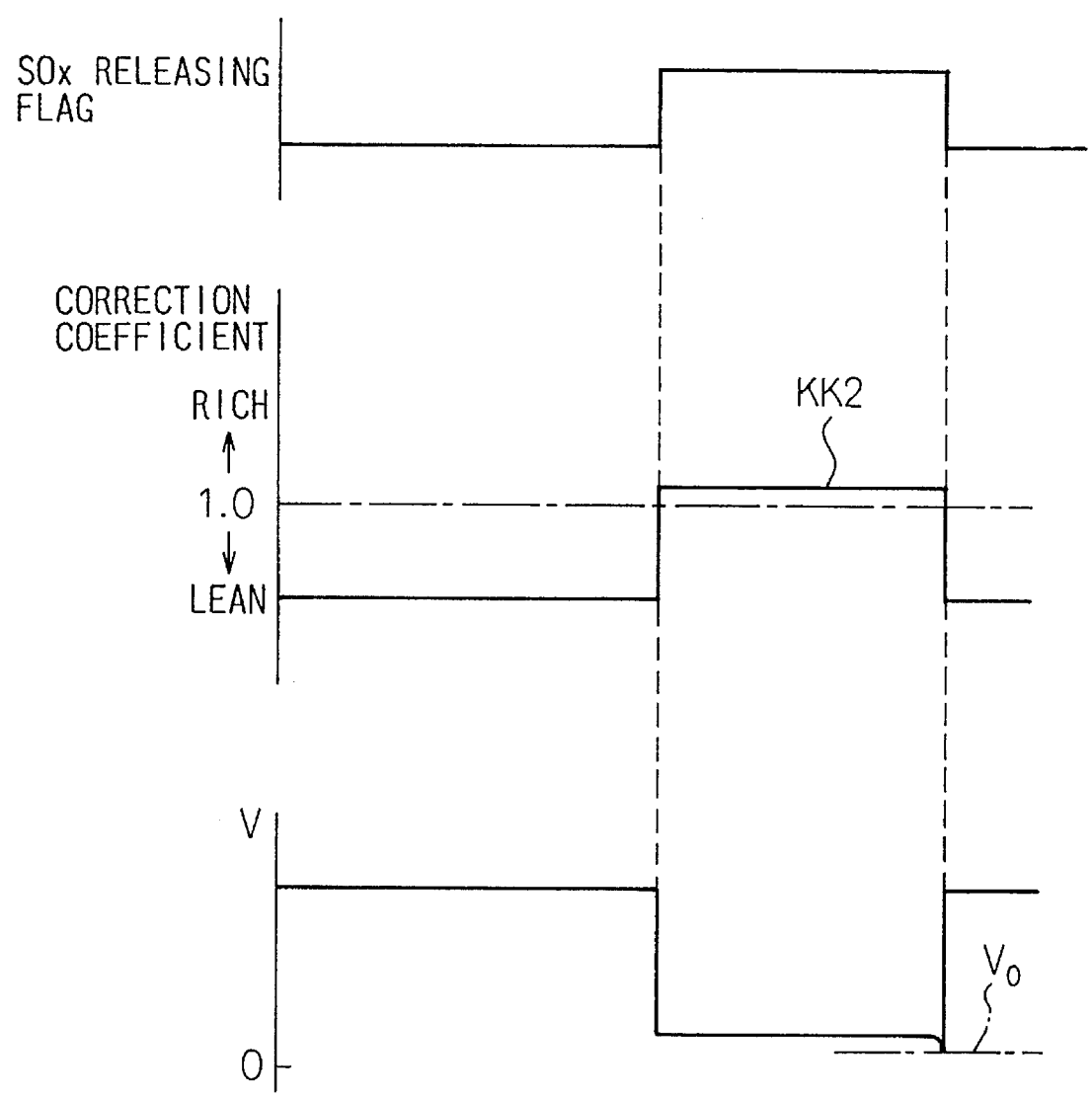
FIG. 15 is a time chart of the control of the release of SOx.

As opposed to this, when $V_{min}$<MIN, the routine proceeds to step 212, where the SOx releasing flag is set. If the SOx releasing flag is set, the routine proceeds from step 103 to step 109 of FIG. 12, where the correction coefficient KK2 (>1.0) is multiplied with the basic fuel injection time TP so as to calculate the fuel injection time TAU (=TP·KK2). Accordingly, as shown in FIG. 15, when the SOx releasing flag is set, the air-fuel ratio of the air-fuel mixture is made rich. At this time, the degree of richness of the air-fuel ratio is made smaller by the SOx gradually released from the NOx absorbent 18 so that all of the HC and CO can be made to oxidize. At this time too, while the SOx is being released from the NOx absorbent 18, the air-fuel ratio of the exhaust gas flowing out from the NOx absorbent 18 is maintained substantially at the stoichiometric air-fuel ratio. Next, when the release of SOx from the NOx absorbent 18 is completed, the output voltage V of the $O_2$ sensor 22 falls. Accordingly, at step 110 in FIG. 12, it is judged if the output voltage V of the $O_2$ sensor 22 has fallen below a fixed voltage $V_o$. When V<$V_o$, the routine proceeds to step 111, where the SOx releasing flag is reset.

Figure 16:
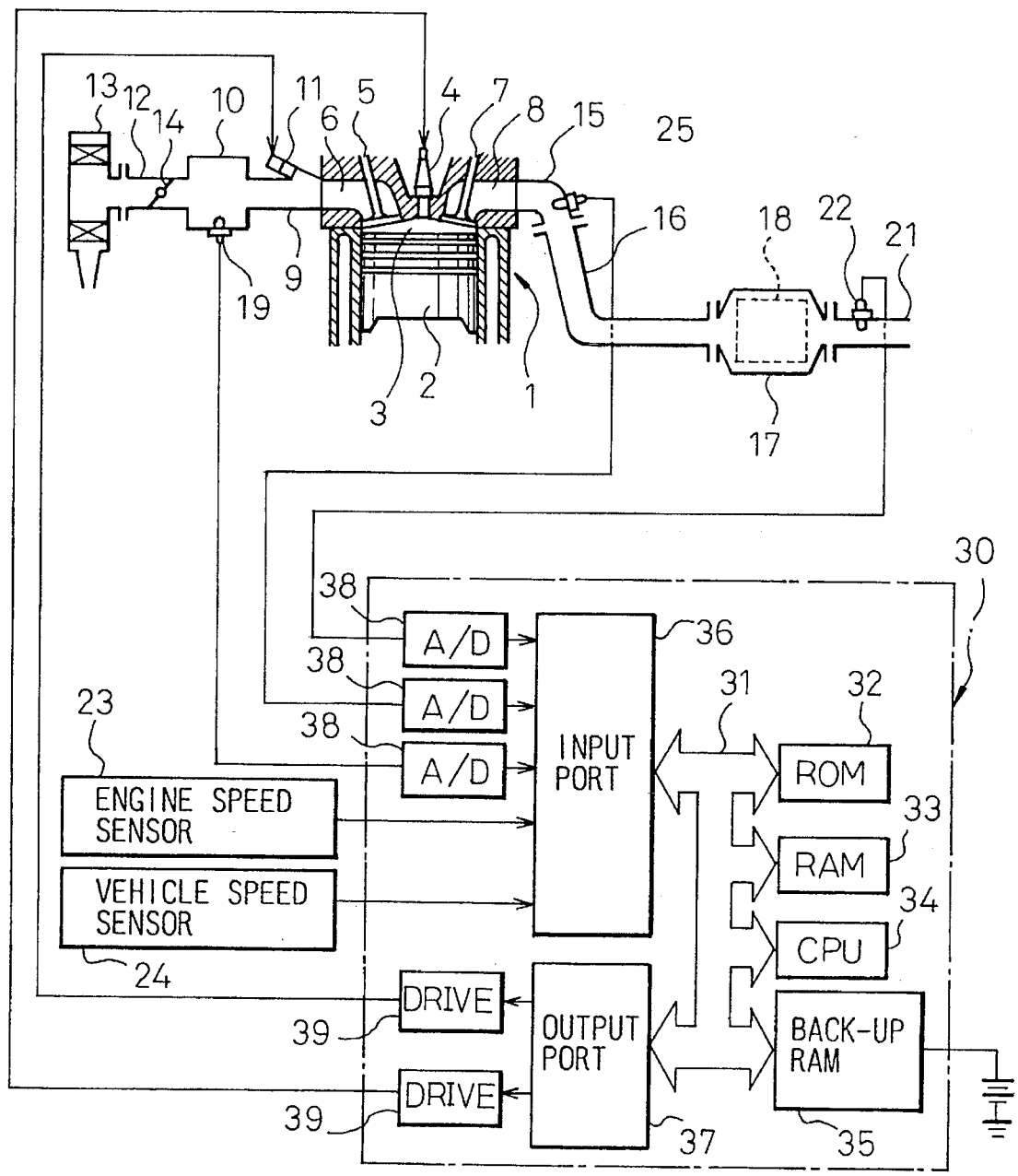
FIG. 16 is an overall view of another embodiment of an internal combustion engine.

FIG. 16 shows another embodiment. Note that in this embodiment, the same components as in FIG. 1 are shown by the same references.

Referring to FIG. 16, in this embodiment too, the exhaust pipe 16 has connected to it a casing 17 housing an exhaust purification element 18. In this embodiment, however, the exhaust purification element 18 is comprised of a three-way catalyst. Further, in this embodiment, in addition to the $O_2$ sensor 22, another $O_2$ sensor 25 is arranged in the exhaust manifold 15. The output of this $O_2$ sensor 25 is input through the corresponding AD converter 38 to the input port 36. This $O_2$ sensor 25 differs from the $O_2$ sensor 22 in that when the air-fuel ratio of the exhaust gas becomes lean, it produces an output voltage of about 0.1 V, while when the air-fuel ratio of the exhaust gas becomes rich, it produces an output voltage of about 0.9 V.

In this embodiment, the fuel injection time TAU is calculated basically based on the following equation:

$$TAU=TP \cdot K \cdot FAF$$

Here, TP indicates the basic fuel injection time shown in FIG. 2, K indicates a correction coefficient, and FAF indicates a feedback correction coefficient. The feedback correction coefficient FAF is a coefficient for making the air-fuel ratio accurately match the stoichiometric air-fuel ratio based on the output signal of the $O_2$ sensor 25 when K=1.0, that is, when the air-fuel ratio of the air-fuel mixture fed to the engine cylinder should be made the stoichiometric air-fuel ratio. This feedback correction coefficient FAF moves above and below the level of substantially 1.0. The FAF decreases when the air-fuel mixture becomes rich and increases when the air-fuel mixture becomes lean. Note that when K<1.0 or K>1.0, FAF is fixed to 1.0.

The three-way catalyst 18 has its highest rate of removal of unburnt HC, CO, and NOx when the air-fuel ratio of the exhaust gas flowing into the three-way catalyst 18, in the embodiment shown in FIG. 16, the air-fuel ratio of the air-fuel mixture, is made to alternately change between the lean side and rich side with respect to the stoichiometric air-fuel ratio. This is based on the function of the three-way catalyst 18 of storing oxygen, that is, the so-called $O_2$ storage function. That is, the three-way catalyst 18 seizes the oxygen from inside the exhaust gas and stores it when the air-fuel ratio of the exhaust gas becomes lean. As a result, the NOx is reduced. As opposed to this, when the air-fuel ratio of the exhaust gas becomes rich, the unburnt HC and CO seize the oxygen stored in the three-way catalyst 18 and, as a result, the unburnt HC and the CO are made to be oxidized. In this way, the three-way catalyst 18 removes the unburnt HC, CO, and NOx based on the $O_2$ storage function. When the $O_2$ storage function weakens, the rate of removal falls, that is, the three-way catalyst 18 deteriorates.

Figure 17:
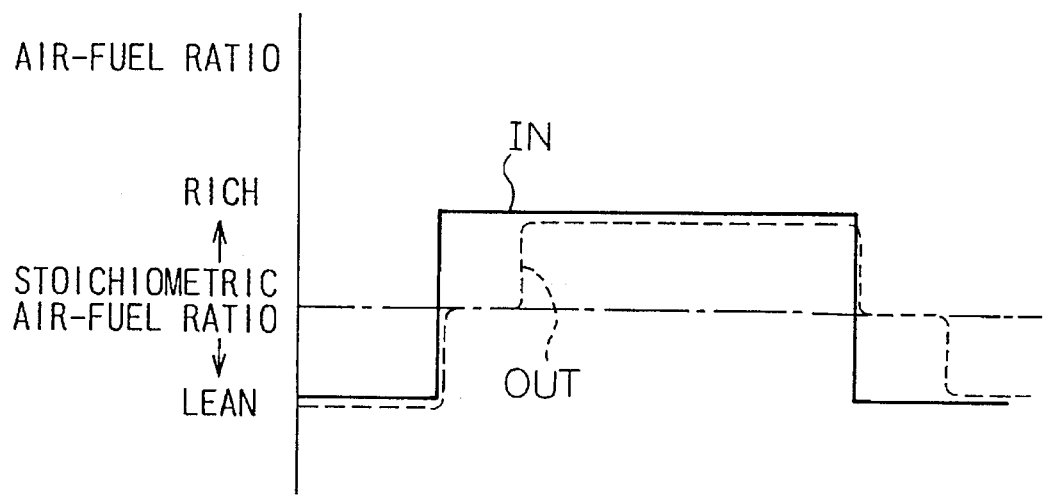
FIG. 17 is a view of the air-fuel ratio of the inflowing exhaust gas and the outflowing exhaust gas of the three-way catalyst.

FIG. 17 shows the case where the air-fuel ratio of the exhaust gas flowing into the three-way catalyst 18 is forcibly changed from lean to rich and then from rich to lean as shown by the solid line IN. Note that the broken line OUT shows the air-fuel ratio of the exhaust gas flowing out from the three-way catalyst 18 at this time. Referring to FIG. 17, if the air-fuel ratio IN of the exhaust gas flowing into the three-way catalyst 18 is changed from lean to rich, during the period in which the oxygen in the exhaust gas is taken into the three-way catalyst 18, the air-fuel ratio OUT of the exhaust gas flowing out from the three-way catalyst 18 is maintained substantially at the stoichiometric air-fuel ratio. Next, when the storage capacity of the oxygen is saturated, the air-fuel ratio OUT of the exhaust gas flowing out from the three-way catalyst 18 becomes rich. Accordingly, the higher the $O_2$ storage capacity, the longer the time during which the air-fuel ratio OUT of the exhaust gas flowing out from the three-way catalyst 18 is maintained substantially at the stoichiometric air-fuel ratio.

On the other hand, if the air-fuel ratio IN of the exhaust gas flowing into the three-way catalyst 18 is changed from rich to lean, the air-fuel ratio OUT of the exhaust gas flowing out from the three-way catalyst 18 is maintained substantially at the stoichiometric air-fuel ratio for the time when the oxygen stored in the three-way catalyst 18 is being consumed. When all of the stored oxygen is consumed, the air-fuel ratio OUT of the exhaust gas flowing out from the three-way catalyst 18 becomes rich. Accordingly, in this case too, the higher the $O_2$ storage capacity, the longer the time during which the air-fuel ratio OUT of the exhaust gas flowing out from the three-way catalyst 18 is maintained substantially at the stoichiometric air-fuel ratio.

Figure 19:
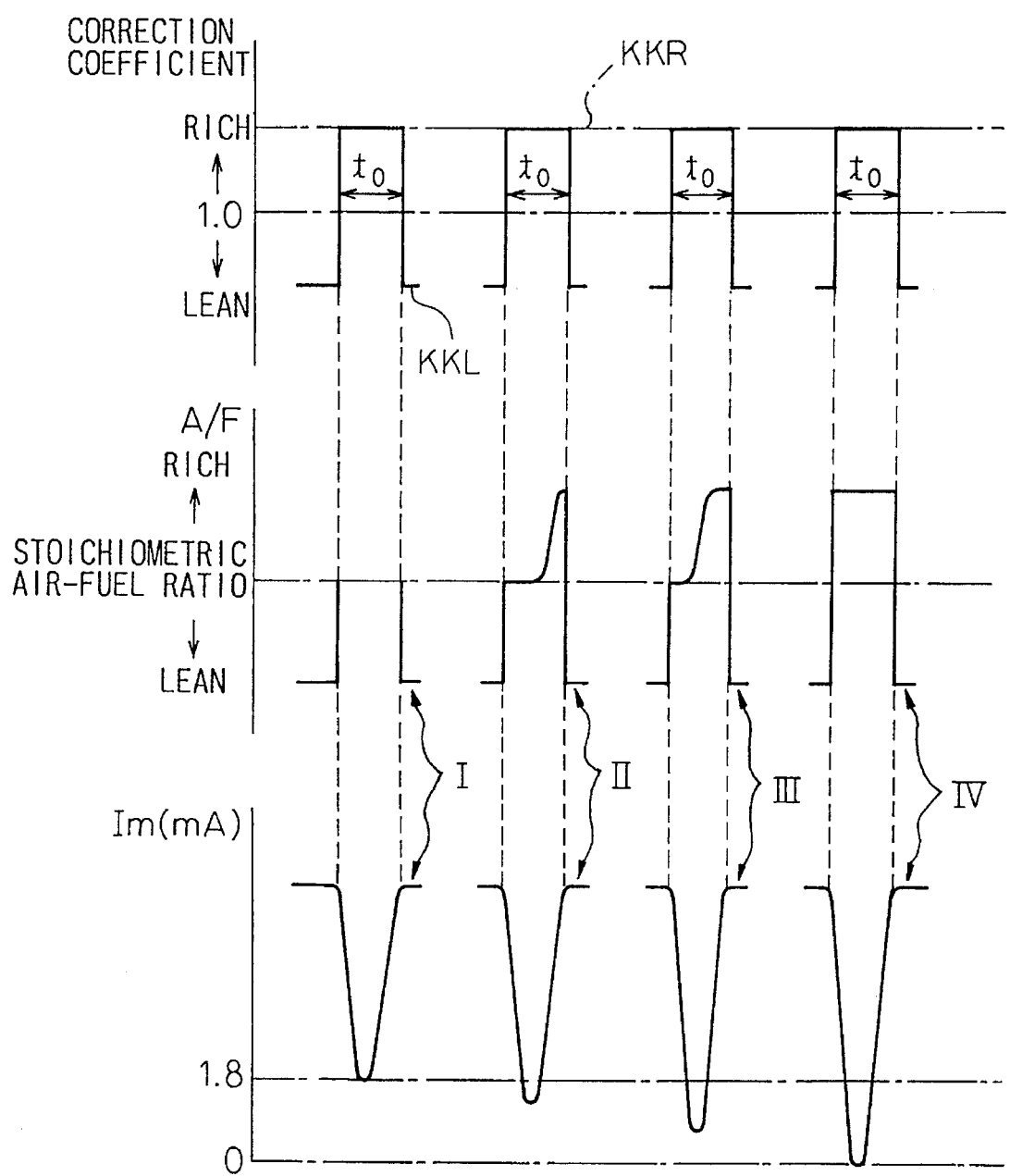
FIG. 19 is a view for explaining a method of detection of the deterioration of a three-way catalyst.

FIG. 19 shows, by A/F, the changes in the air-fuel ratio of the exhaust gas flowing out from the three-way catalyst 18 when the correction coefficient with respect to the basic fuel injection time TP is made KKR (>1.0) for a predetermined fixed time $t_o$, that is, when the air-fuel ratio of the air-fuel mixture is made rich for a predetermined fixed time $t_o$. Note that in FIG. 19, I indicates when the three-way catalyst 18 is new, II indicates when the three-way catalyst 18 has deteriorated slightly, III indicates when the three-way catalyst 18 has further deteriorated, and IV indicates when the three-way catalyst 18 has completely deteriorated. As shown in FIG. 19, along with the deterioration of the three-way catalyst 18, the time during which the air-fuel ratio A/F of the exhaust gas is maintained substantially at the stoichiometric air-fuel ratio gradually becomes shorter. When the three-way catalyst 18 completely deteriorates, the air-fuel ratio A/F of the exhaust gas is no longer maintained at the stoichiometric air-fuel ratio at all.

Figure 18:
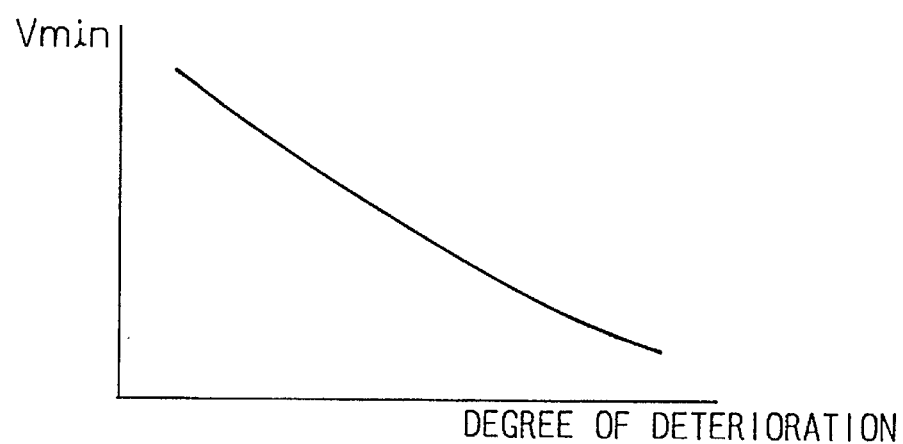
FIG. 18 is a view of the degree of deterioration.

On the other hand, if the air-fuel ratio of the air-fuel mixture is made rich for the fixed time $t_o$ as shown in FIG. 19, the minimum peak value of the current $I_m$ (mA) of the $O_2$ sensor 22 becomes smaller the larger the degree of deterioration of the three-way catalyst 18 as shown in FIG. 19. That is, when the three-way catalyst 18 is new, as shown by I, the minimum peak value of the current $I_m$ becomes about 1.8 mA. Along with the deterioration of the three-way catalyst 18, as shown by II and III, the minimum peak value gradually becomes smaller. When the three-way catalyst 18 completely deteriorates, as shown by IV, the minimum peak value of the current $I_m$ becomes zero. Accordingly, as shown in FIG. 18, the lower the minimum peak voltage $V_{min}$ of the output voltage of the $O_2$ sensor 22 corresponding to the minimum peak value of the current $I_m$, the larger the degree of deterioration of the three-way catalyst 18.

Figure 20:
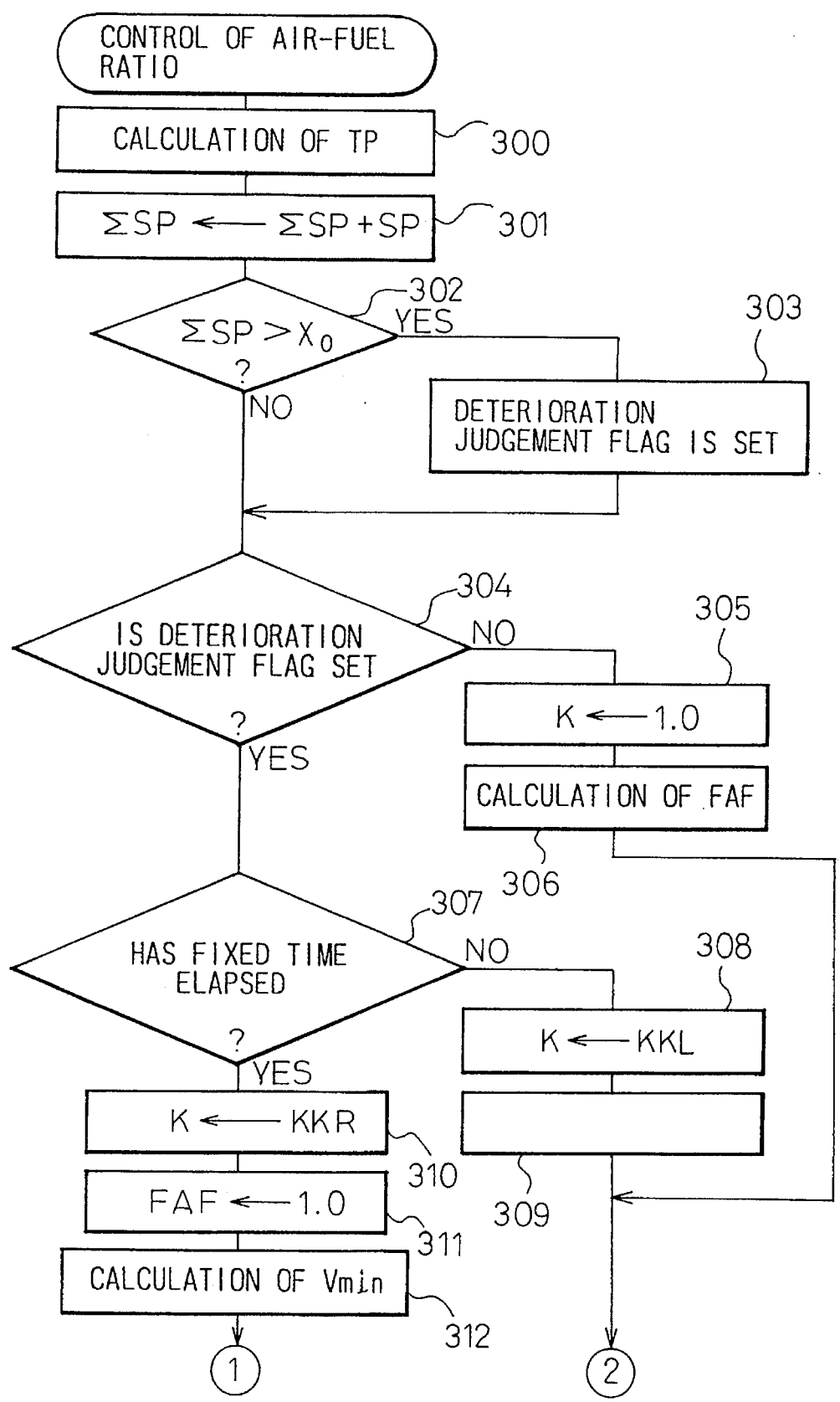
FIGS. 20 and 21 are flow charts for the control of the air-fuel ratio.
Figure 21:
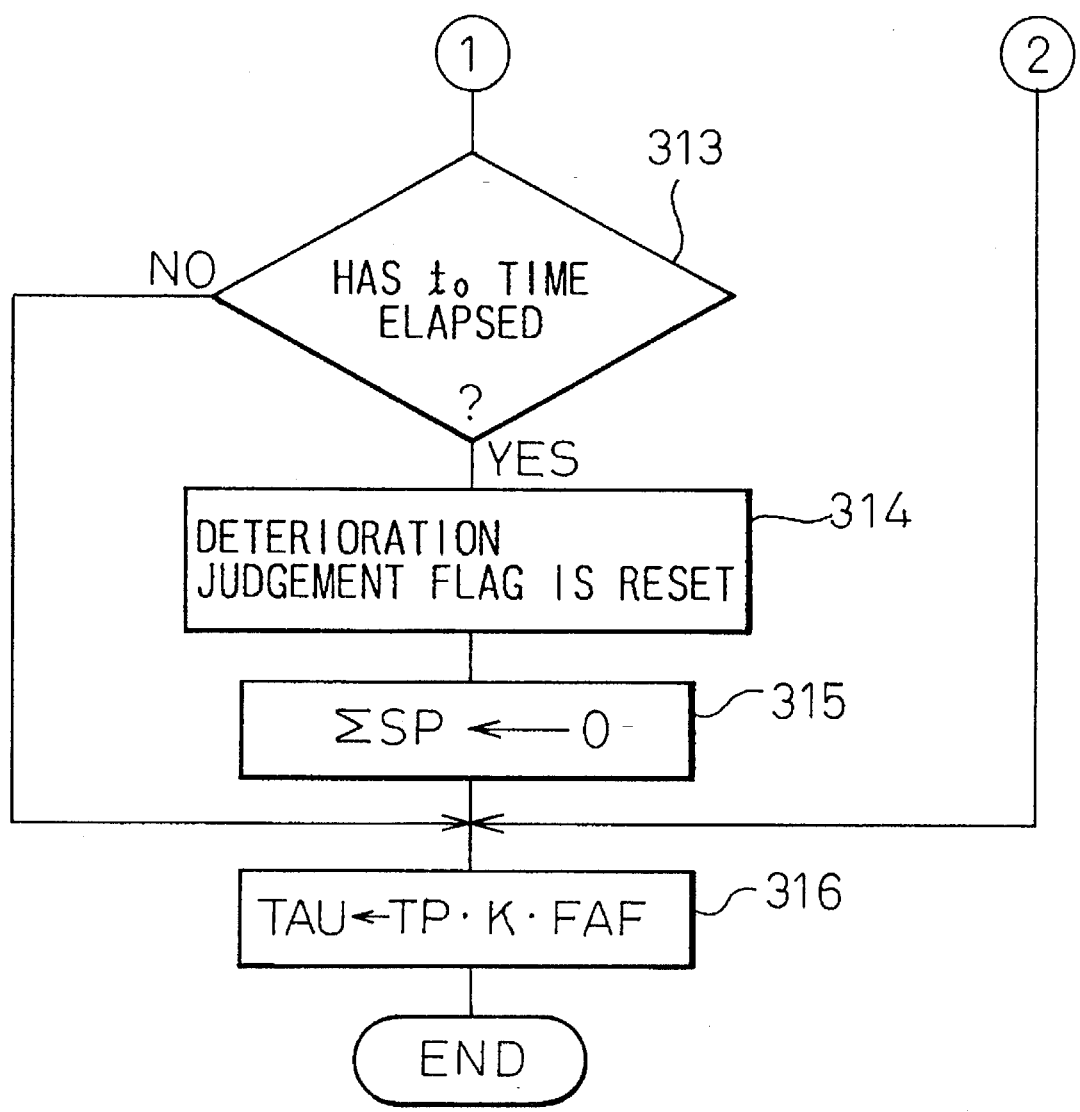

FIG. 20 and FIG. 21 show the routine for control of the air-fuel ratio. This routine is executed by interruption every fixed time.

Referring to FIG. 20 and FIG. 21, first, at step 300, the basic fuel injection time TP is calculated from the relationship shown in FIG. 2. Next, at step 301, the vehicle speed SP is added to the ΣSP to calculate the cumulative running distance ΣSP. Next, at step 302, it is judged if the cumulative running distance ΣSP has become larger than the set value $X_o$. When ΣSP≦$X_o$, the routine proceeds to step 304, where it is judged if a deterioration judgement flag showing that the deterioration of the three-way catalyst 18 should be judged has been set or not. When the deterioration judgement flag has not been set, the routine proceeds to step 305.

At step 305, the correction coefficient K is made 1.0. Next, at step 306, the feedback correction coefficient FAF is calculated based on the output signal of the $O_2$ sensor 25. Next, the routine proceeds to step 316, where the fuel injection time TAU is calculated by the following equation:

$$TAU = TP \cdot K \cdot FAF$$

Feedback control is performed so that the air-fuel ratio of the air-fuel mixture at this time becomes the stoichiometric air-fuel ratio.

On the other hand, when it is judged at step 302 that $\Sigma SP > X_o$, the routine proceeds to step 303, where a deterioration judgement flag is set, then the routine proceeds through step 304 to step 307. At step 307, it is judged if a fixed time has elapsed from when the deterioration judgement flag was set. When the fixed time has not elapsed, the routine proceeds to step 305, where the correction coefficient K is made KKL (<1.0), then proceeds to step 309, where the feedback correction coefficient FAF is fixed to 1.0. Next, the routine proceeds to step 316. Accordingly, the air-fuel ratio of the air-fuel mixture is maintained lean until a fixed time has elapsed from when the deterioration judgement flag has been set.

When it is judged at step 307 that a fixed time has elapsed, the routine proceeds to step 310, where the correction coefficient K is made KKR (>1.0), then proceeds to step 311, where the feedback correction coefficient FAF is fixed to 1.0. Next, at step 312, the minimum peak voltage value $V_{min}$ of the output voltage of the $O_2$ sensor 22 is calculated. Then, at step 313, it is judged if the predetermined fixed time $t_o$ has elapsed or not. When the fixed time has not elapsed, the routine proceeds to step 316. Accordingly, during the fixed time $t_o$, the air-fuel ratio of the air-fuel mixture is made rich and the degree of deterioration of the three-way catalyst 18 from the minimum peak voltage $V_{min}$ during that period is judged.

When the fixed time $t_o$ elapses, the routine proceeds from step 313 to step 314, where the deterioration judgement flag is set, then proceeds to step 315, where $\Sigma SP$ is made zero.

Figure 22:
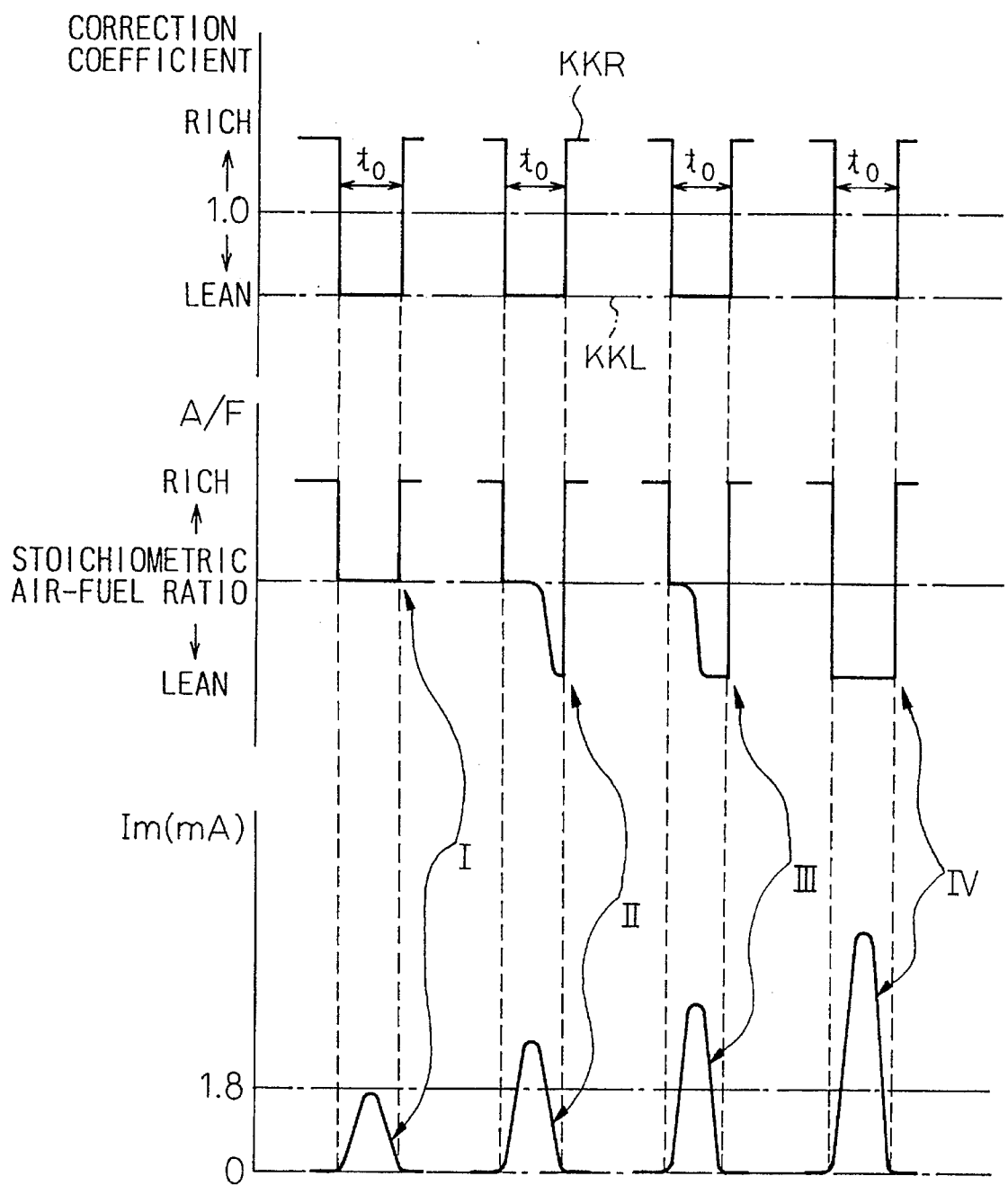
FIG. 22 is a view for explaining another method of detection of the deterioration of a three-way catalyst.

In the embodiment shown in FIG. 20 and FIG. 21, the degree of deterioration of the three-way catalyst 18 is detected by making the air-fuel ratio of the air-fuel mixture rich for a fixed period $t_o$, but it is also possible to detect the degree of deterioration of the three-way catalyst 18 by changing the air-fuel ratio of the air-fuel mixture from rich to lean for the fixed time $t_o$ as shown in FIG. 22. In this case, as shown in FIG. 22, the larger the degree of deterioration of the three-way catalyst 18, the higher the maximum peak value of the current $I_m$ of the $O_2$ sensor 22.

According to the present invention, it is possible to accurately detect the degree of deterioration of an exhaust gas purification element.

While the invention has been described by reference to specific embodiments chosen for purposes of illustration, it should be apparent that numerous modifications could be made thereto by those skilled in the art without departing from the basic concept and scope of the invention.

We claim:

1. An exhaust purification device of an engine having an exhaust passage, comprising:

an exhaust purification element arranged in the exhaust passage to remove harmful components contained in an exhaust gas, said exhaust purification element having the property that, when an air-fuel ratio of the exhaust gas flowing into said exhaust purification element is changed from lean to rich, an air-fuel ratio of the exhaust gas flowing out from the exhaust purification element is temporarily maintained substantially at the stoichiometric air-fuel ratio and then changed to rich and, at this time, the time during which the air-fuel ratio of the exhaust gas flowing out from the exhaust purification element is maintained substantially at the stoichiometric air-fuel ratio becoming shorter as the exhaust purification element deteriorates;

an oxygen concentration sensor arranged in the exhaust passage downstream of said exhaust purification element and producing an output having a level which is proportional to the oxygen concentration in the exhaust gas;

air-fuel ratio change-over means for temporarily changing the air-fuel ratio of the exhaust gas, which flows into said exhaust purification element, from lean to rich for a predetermined fixed time;

peak value detecting means for finding a peak value of the level of the output of said oxygen concentration sensor within said predetermined fixed time during which the air-fuel ratio of the exhaust gas flowing into said exhaust purification element is temporarily maintained at a rich air-fuel ratio by said air-fuel ratio change-over means; and judgement means for judging a degree of deterioration of said exhaust purification element on the basis of said peak value of the level of the output.

2. An exhaust purification device as set forth in claim 1, wherein the peak value of the output of the oxygen concentration sensor changes in accordance with the degree of deterioration of said oxygen concentration sensor.

3. An exhaust purification device as set forth in claim 1, wherein said air-fuel ratio change-over means controls the air-fuel ratio of the exhaust gas flowing into said exhaust purification element by controlling the air-fuel ratio of the air-fuel mixture fed to the engine.

4. An exhaust purification device as set forth in claim 1, wherein said exhaust purification element is comprised of a NOx absorbent which absorbs NOx when the air-fuel ratio of the inflowing exhaust gas is lean and releases the absorbed NOx when the air-fuel ratio of the inflowing exhaust gas becomes rich.

5. An exhaust purification device as set forth in claim 4, wherein said NOx absorbent includes platinum and at least one element selected from the group comprised of alkali metals such as potassium, sodium, lithium, and cesium, alkali earths such as barium and calcium, and rare earths such as lanthanum and yttrium.

6. An exhaust purification device as set forth in claim 4, wherein said air-fuel ratio change-over means, in addition to a first air-fuel ratio change-over action for changing the air-fuel ratio of the exhaust gas flowing into the exhaust purification element from lean to rich temporarily for said predetermined fixed time so as to judge the degree of deterioration of the NOx absorbent, performs a second air-fuel ratio change-over action for changing the air-fuel ratio of the exhaust gas flowing into the exhaust purification element temporarily from lean to rich at a frequency higher than said first air-fuel ratio change-over action so as to cause the NOx to be released from said NOx absorbent.

7. An exhaust purification device as set forth in claim 6, wherein the rich time when said second air-fuel ratio change-over action is performed is made shorter the higher the degree of deterioration of the NOx absorbent.

8. An exhaust purification device as set forth in claim 6, wherein absorbed NOx estimating means is provided for estimating the amount of NOx absorbed in said NOx absorbent, said second air-fuel ratio change-over action being performed when the amount of absorbed NOx estimated by said absorbed NOx estimating means exceeds a predetermined maximum allowable value.

9. An exhaust purification device as set forth in claim 8, wherein said maximum allowable value is made smaller the higher the degree of deterioration of the NOx absorbent.

10. An exhaust purification device as set forth in claim 6, wherein said air-fuel ratio change-over means performs a third air-fuel ratio change-over action for changing the air-fuel ratio of the exhaust gas flowing into said exhaust purification element temporarily from lean to rich to cause SOx to be released from the NOx absorbent, the degree of richness when said third air-fuel ratio change-over action is performed being lower than the degree of richness when said second air-fuel ratio change-over action is performed, and the rich time when said third air-fuel ratio change-over action is performed being longer than the rich time when said second air-fuel ratio change-over action is performed.

11. An exhaust purification device as set forth in claim 10, wherein said third air-fuel ratio change-over action is performed when the degree of deterioration of the NOx absorbent becomes lower than a predetermined degree.

12. An exhaust purification device as set forth in claim 1, wherein said exhaust purification element is comprised of a three-way catalyst.

13. An exhaust purification device as set forth in claim 12, wherein control means is provided for controlling the air-fuel ratio of the exhaust gas flowing into said three-way catalyst substantially to the stoichiometric air-fuel ratio and wherein said air-fuel ratio change-over means changes the air-fuel ratio of the exhaust gas flowing into the exhaust purification element once from the stoichiometric air-fuel ratio to lean, then to rich when judging the deterioration of the three-way catalyst.

14. An exhaust purification device of an engine having an exhaust passage, comprising:

an exhaust purification element arranged in the exhaust passage to remove harmful components contained in an exhaust gas, said exhaust purification element having the property that, when an air-fuel ratio of the exhaust gas flowing into said exhaust purification element is changed from rich to lean, an air-fuel ratio of the exhaust gas flowing out from the exhaust purification element is temporarily maintained substantially at the stoichiometric air-fuel ratio and then changed to rich and, at this time, the time during which the air-fuel ratio of the exhaust gas flowing out from the exhaust purification element is maintained substantially at the stoichiometric air-fuel ratio becoming shorter as the exhaust purification element deteriorates;

an oxygen concentration sensor arranged in the exhaust passage downstream of said exhaust purification element and producing an output having a level which is proportional to the oxygen concentration in the exhaust gas;

air-fuel ratio change-over means for temporarily changing the air-fuel ratio of the exhaust gas, which flows into said exhaust purification element, from rich to lean for a predetermined fixed time;

peak value detecting means for finding a peak value of the level of the output of said oxygen concentration sensor within said predetermined fixed time during which the air-fuel ratio of the exhaust gas flowing into said exhaust purification element is temporarily maintained at a lean air-fuel ratio by said air-fuel ratio change-over means; and judgement means for judging a degree of deterioration of said exhaust purification element on, the basis of said peak value of the level of the output.

15. An exhaust purification device as set forth in claim 14, wherein said exhaust purification element is comprised of a three-way catalyst.

16. An exhaust purification device as set forth in claim 15, wherein control means is provided for controlling the air-fuel ratio of the exhaust gas flowing into said three-way catalyst substantially to the stoichiometric air-fuel ratio and wherein said air-fuel ratio change-over means changes the air-fuel ratio of the exhaust gas flowing into the exhaust purification element once from the stoichiometric air-fuel ratio to rich, then to lean when judging the deterioration of the three-way catalyst.

* * * * *